United States Patent
Guthrie et al.

(10) Patent No.: US 11,256,223 B2
(45) Date of Patent: Feb. 22, 2022

(54) PERFORMANCE ASSESSMENT DEVICE FOR MONITORING AND COMPARING ATTRIBUTES OF A BUILDING MANAGEMENT SYSTEM OVER TIME

(71) Applicant: Johnson Controls Technology Company, Auburn Hills, MI (US)

(72) Inventors: Dana A. Guthrie, St. Francis, WI (US); Shawn D. Schubert, Oak Creek, WI (US); Michael J. Zummo, Milwaukee, WI (US); Jason T. Sawyer, Greendale, WI (US)

(73) Assignee: Johnson Controls Tyco IP Holdings LLP, Milwaukee, WI (US)

(*) Notice: Subject to any disclaimer, the term of this patent is extended or adjusted under 35 U.S.C. 154(b) by 0 days.

(21) Appl. No.: 16/553,830

(22) Filed: Aug. 28, 2019

(65) Prior Publication Data
US 2019/0384243 A1   Dec. 19, 2019

Related U.S. Application Data

(63) Continuation of application No. 15/289,934, filed on Oct. 10, 2016, now Pat. No. 10,401,810.

(51) Int. Cl.
*G05B 15/02* (2006.01)
(52) U.S. Cl.
CPC .... *G05B 15/02* (2013.01); *G05B 2219/25011* (2013.01); *G05B 2219/2642* (2013.01)

(58) Field of Classification Search
CPC ............... G05B 15/02; G05B 19/0428; G05B 2219/25011
See application file for complete search history.

(56) References Cited

U.S. PATENT DOCUMENTS

| | | | | |
|---|---|---|---|---|
| 2007/0043476 A1* | 2/2007 | Richards | ............... | F24F 11/62 700/276 |
| 2008/0196023 A1* | 8/2008 | Park | ............... | F24F 11/30 717/173 |
| 2008/0236177 A1* | 10/2008 | Senba | ............... | F24F 11/30 62/157 |
| 2009/0012654 A1* | 1/2009 | Culp | ............... | H04L 67/125 700/291 |
| 2009/0271001 A1* | 10/2009 | Westphal | ............... | G05B 15/02 700/3 |
| 2010/0102973 A1* | 4/2010 | Grohman | ............... | H04L 12/2823 340/584 |
| 2010/0106319 A1* | 4/2010 | Grohman | ............... | G05D 27/02 700/276 |

(Continued)

*Primary Examiner* — Michael J Huntley
(74) *Attorney, Agent, or Firm* — Foley & Lardner LLP

(57) ABSTRACT

A performance assessment device for evaluating a building management system (BMS). The device includes a communication interface. The communication interface is configured to communicate with a BMS network, the BMS network in communication with the BMS. The device further includes a processing circuit. The processing circuit is configured to receive data related to the BMS via the communication interface. The processing circuit is further configured to evaluate the data related to the BMS to generate a current assessment of the attributes of the BMS, and to compare the current assessment of the attributes of the BMS to a previously determined assessment of the attributes of the BMS.

20 Claims, 33 Drawing Sheets

(56) References Cited

U.S. PATENT DOCUMENTS

| | | | |
|---|---|---|---|
| 2010/0286937 A1 | 11/2010 | Hedley et al. | |
| 2010/0324962 A1* | 12/2010 | Nesler | G05B 17/02 |
| | | | 705/7.36 |
| 2011/0314320 A1* | 12/2011 | Chang | H04L 12/2803 |
| | | | 713/340 |
| 2012/0022700 A1 | 1/2012 | Drees et al. | |
| 2012/0064923 A1* | 3/2012 | Imes | G05D 23/1923 |
| | | | 455/457 |
| 2012/0101778 A1* | 4/2012 | Gyota | G05G 5/06 |
| | | | 702/183 |
| 2012/0259583 A1 | 10/2012 | Noboa et al. | |
| 2014/0058572 A1 | 2/2014 | Stein et al. | |
| 2014/0114489 A1 | 4/2014 | Duff | |
| 2014/0148968 A1* | 5/2014 | Chapman | F24F 11/62 |
| | | | 700/300 |
| 2015/0061896 A1* | 3/2015 | Walther | G08G 1/04 |
| | | | 340/909 |
| 2015/0127174 A1 | 5/2015 | Quam et al. | |
| 2015/0128618 A1* | 5/2015 | Park | F24F 11/30 |
| | | | 62/56 |
| 2015/0142176 A1* | 5/2015 | Senba | G05B 15/02 |
| | | | 700/275 |
| 2015/0159895 A1* | 6/2015 | Quam | H05K 7/12 |
| | | | 700/275 |
| 2015/0178865 A1* | 6/2015 | Anderson | G05B 17/02 |
| | | | 705/7.25 |
| 2015/0323918 A1 | 11/2015 | Nair et al. | |
| 2016/0011573 A1* | 1/2016 | Marti | G05B 15/02 |
| | | | 700/9 |
| 2016/0335731 A1* | 11/2016 | Hall | G06Q 10/067 |
| 2017/0314800 A1* | 11/2017 | Bengea | F24F 11/30 |
| 2017/0315697 A1 | 11/2017 | Jacobson et al. | |
| 2018/0195755 A1* | 7/2018 | Nishida | H02J 13/0062 |

\* cited by examiner

Project Information

Provide unique information to assist in tracking and trending information for a particular customer location.

Project Name ⎯⎯⎯⎯ 802
Branch ⎯⎯⎯⎯ 804
Field Technician Name ⎯⎯⎯⎯ 806

[ Next ]

Compare Projects

Select the two projects to see the differences between.

First Project FIle    902 ⎯⎯⎯⎯ [ Browse... ]
Second Project FIle  904 ⎯⎯⎯⎯ [ Browse... ]
Comparey Type       906 ⎯⎯⎯⎯ Inventory ▼

[ Cancel ] [ Compare Files ]

Site Assessment Tool    Compare Inventory

Side by Side ▼

| 1102 | 1104 |

September 3, 2015

Critical Issues (3)
- Firmware Security Vulnerability @ 5.2.0.0
- Last database backup: Sep 1, 2015
- 75% of controllers are N2 Legacy devices

Preventative Maintenance (2)
- 5% of supervisory devices exceed MSEA limitations
- Out-of-date Firmware: 6.0 Release Jan 1

Key Tasks (2)
- Backup database immediately
- Upgrade 20 controllers from 5.2.0.0 to 5.2.1.1100

Server Information

| | |
|---|---|
| ADS/X Model | ADS |
| Name | ADS-1 |
| IP Address | 10.5.32.445 |
| Server OS | Windows NT 4.1 |
| Version | 5.2.0.1000 |
| SQL Version | SQL 12.1 |
| Last Backup | Sep 1, 2015 |
| Count of supervisoy controls | 50 |

Server Recommendations
- Upgrade to latest version of software

Site Information

| | |
|---|---|
| Servers | 1 |
| Supervisory Devices | 53 |
| Controllers | 200 |
| Total Point Count | 8000 |

NAE Firmware Version

- 5.2.0.1000
- 2.2.0.1000
- 3
- 4
- 5

---

March 17, 2016

Critical Issues (2)
- Controller Firmware Security Vulnerability @ 5.2.0.0
- 50% of controllers are N2 Legacy devices

Preventative Maintenance (1)
- 7% of supervisory devices exceed MSEA limitations

Key Tasks (1)
- Upgrade 20 controllers from 5.2.0.0 to 5.2.1.1100

Server Information

| | |
|---|---|
| ADS/X Model | ADS |
| Name | ADS-1 |
| IP Address | 10.5.32.445 |
| Server OS | Windows NT 4.1 |
| Version | 6.0.0.1000 |
| SQL Version | SQL 12.1 |
| Last Backup | Sep 1, 2015 |
| Count of supervisoy controls | 50 |

Server Recommendations
- Upgrade to latest version of software

Site Information

| | |
|---|---|
| Servers | 1 |
| Supervisory Devices | 60 |
| Controllers | 325 |
| Total Point Count | 8642 |

NAE Firmware Version

FIG. 11

Site Assessment Tool

Summary

[Differences ▼]

Critical Issues (3) — 1204
- More recent backup perforrmaed Mar 1, 2016
- N2 Legacy devices decreased by 25%
- 2% increase in supervisory devices exceeding MSEA limitations

Preventative Maintenance (2) — 1206
- 7% of supervisory devices exceed MSEA limitations
- Out-of-date Firmware: 6.0 Release Jan 1

Key Tasks (1) — 1208
- Upgrade 20 controllers from 5.2.0.0 to 5.2.1.1100

Server Information

Version            6.0.0.0000

Site Information — 1202

| | |
|---|---|
| Supervisory Devices | +7 |
| Controllers | +125 |
| Total Point Count | +642 |

NAE Firmware Version

Site Assessment Tool — Performance

[Analysis] [Supervisory Devices] [Controllers] [Points]

Project Summary
mm/dd/yyyy hh:mm AM/PM

Performance & Settings [ 7 ] — 1412 / 1404
- Scheduling
- Economizer
- Fan Motors
- AHU Supply Fan Static Pressure Reset
- AHU Discharge Air Temp Reset
- 100% Outdoor AHU
- No. of Heating Valves Open Compared to OA-T

Maintenance & Reliability [ 9 ] — 1414 / 1406
- Dirty Filter
- Chiller Operating Hours
- Unbound References
- Improperly Addressed Devices
- Missing Trends
- Alarms/Events
- % Site Exceeding MSEA Recommendations
- Lats Backup > 6 months old

Securty & Standards [ 6 ] — 1416 / 1408
- Default Password
- All Admin Users
- U/L Listed Devices
- Firmware Vulnerability
- No. of Dormant Accounts
- Point Categorization
- Standard Naming Convention

Comfort & Health — 1410 [ 4 ] — 1418
- AHU Discharg Air Temperature Variation from Setpoint
- AHU Duct Static Pressure Variation from Setpoint
- CO2 Variation from Setpoint?

Site Information — 1402

| | |
|---|---|
| Servers | 1 |
| Supervisory Devices | 53 |
| Controllers | 200 |
| Total Point Count | 8000 |

NAE Firmware Version
- 5.2.0.1000 (26%)
- 2.2.0.1000 (17%)
- 3 (9%)
- 4 (17%)
- 5 (31%)

Top 5 Key Tasks
- Task #1
- Task #2
- Task #3
- Task #4
- Task #5

FIG. 14

| Site Assessment Tool | Performance ▼ |

| Analysis | Supervisory Devices | Controllers | Points |

Points                                                                 Filter Points The following represents the physical point totals across equipment types that can be validated during a PSA contract.

|        | AHUs | VAVs | FCUs | Totals |
|--------|------|------|------|--------|
| AI     | 700  | 1100 | 321  | 2121   |
| AO     | 500  | 204  | 119  | 823    |
| BI     | 200  | 800  | 308  | 1308   |
| BO     | 250  | 234  | 444  | 728    |
| Totals | 1650 | 2338 | 1192 |        |

FIG. 17

Site Assessment Tool

Maintenance and Reliability

Dirty Filters

Using static pressure sensors, we can measure the pressure drop across a filter and determine the dirt load on the filter. Static pressure increases of greater than .2-.5 in w.g. indicate the filter may need to be replaced. Dirty filters and increased static pressure causes the fan to work harder and use more energy to get air across it.

- Dirty Filters
- Chiller Operating Hours
- Unbound References
- Improperly Addressed Devices
- Missing Trends
- Alarms/Events
- % Site Exceeding MSEA Recommendations
- Last Backup > 6 months old Chiller Operating Hours Unbound References Improperly Addressed Devices Missing Critical Trends Missing Critical Trends Unacknowledged Alarms % Devices Exceeding MSEA Limitations

| Site Assessment Tool |
|---|

Security and Standards

Default Username and Password

Findings: It appears that the default user account and password are being used frequently. This username and password combination is public knowledge and available to be found online. It is recommended that this account be disabled in order to better secure your network.

Admin Users

Findings: It appears 100% of your users have administrative level privileges.
Liability:
Benefit:

| Permission | Description |
|---|---|
| Read-Only | View only access |
| User | Read and write access |
| Administrator | Read/write access, can add new users |

Dormant Accounts

Findings: There are 2 dormant user accounts. A dormant account is an account that has been inactive for the previous 6 months. It is recommended that you either delete or disable dormant user accounts.
Liability:
Benefit:

| User | Last login |
|---|---|
| abc123 | July 15, 2015 |
| tester | April 22, 2015 |

Firmware Vulnerability

Findings: Firmware version x.x.xx.xxxx has a number of security enhancements. All previous firmware versions should be upgraded in order to better secure your network.
Liability:
Benefit:
Click here to see vulnerability list

U/L Listed Devices

Findings: U/L listed devices are used for smoke control. These devices are critical in nature and should not be upgraded
Liability:
Benefit:
Click here to see list of U/L devices

Point Categorization

Findings: All points are categorized as "general" points. If points were appropriately categorized, it would be easier to identify issues with "critical" points.
Liability:
Benefit:

FIG. 20

Site Assessment Tool

Scheduling

Just over 20% of equipment appear to not have a schedule implemented, therefore they are controlling during unoccupied times. Scheduling has a huge impact on annual energy usage. By implementing schedules on the remainder of your equipment, you'll have savings potential of $X-$Y annually.

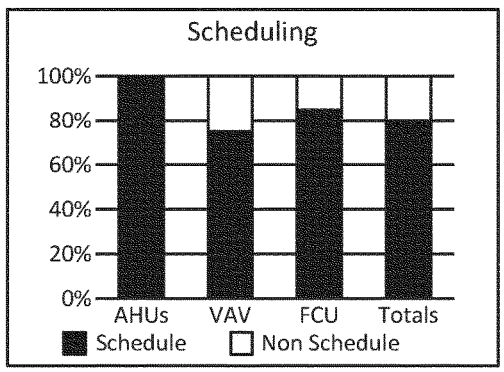

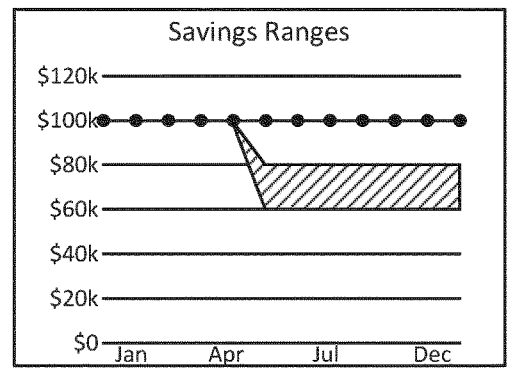

Controllers (20)   [Show Scheduled]  [Show Unscheduled]

| Device | Points | Issue |
|---|---|---|
| Clinics NAE7v128<br>FeedingRm B17-180<br>VMA-1234<br>ADX-1:507-B1FO-<br>NAE02/N2 Trunk 1.N2-5 | Eff-OCC<br>EffHTG-SP<br>EffCLG-SP | Running 24/7 without schedule<br>No setback during unoccupied hours<br>No setback during unoccupied hours |
| Clinics NAE7v128<br>FeedingRm B17-180<br>VMA-1234<br>ADX-1:507-B1FO-<br>NAE02/N2 Trunk 1.N2-5 | Eff-OCC<br>EffHTG-SP<br>EffCLG-SP | Running 24/7 without schedule<br>No setback during unoccupied hours<br>No setback during unoccupied hours |
| Clinics NAE7v128<br>FeedingRm B17-180<br>VMA-1234<br>ADX-1:507-B1FO-<br>NAE02/N2 Trunk 1.N2-5 | Eff-OCC<br>EffHTG-SP<br>EffCLG-SP | Running 24/7 without schedule<br>No setback during unoccupied hours<br>No setback during unoccupied hours |
| Clinics NAE7v128<br>FeedingRm B17-180<br>VMA-1234<br>ADX-1:507-B1FO-<br>NAE02/N2 Trunk 1.N2-5 | Eff-OCC<br>EffHTG-SP<br>EffCLG-SP | Running 24/7 without schedule<br>No setback during unoccupied hours<br>No setback during unoccupied hours |

FIG. 21

Site Assessment Tool

Motors 14 fans are always running at 100% output. Assuming a motor size of "X", there's an annual savings opportunity of "$Y" ensuring fans are properly sized and not slammed at 100%.

Not Ideal

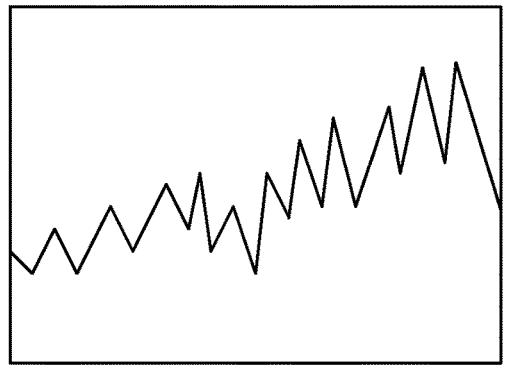

Ideal

Controllers (20)

| Device | Points | Issue |
|---|---|---|
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |

FIG. 22

Site Assessment Tool

AHU Reset Strategies

3 AHUs do not appear to have either a duct static pressure nor discharge air temperature reset strategy. Implementing a reset strategy on your AHUs could result in savings up to "X" per year.

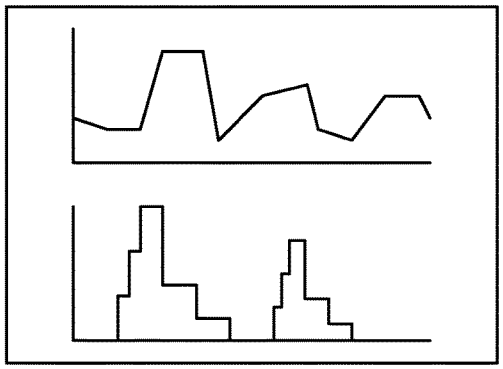
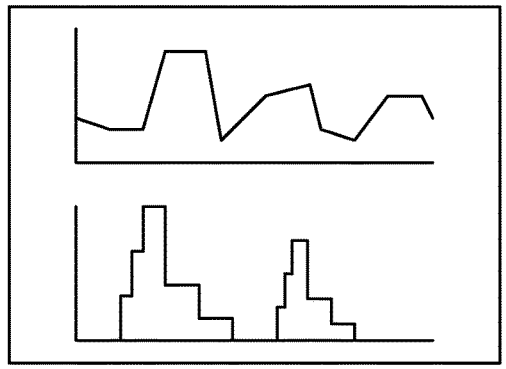

Duct Static Pressure Reset        Discharge Air Temperature Reset

Controllers (20)

| Device | Points | Issue |
| --- | --- | --- |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |

FIG. 23

Site Assessment Tool

100% Outdoor AHUs

In some cases, it is required that dedicated areas of a facility be served by 100% outdoor air. A few examples are operating rooms and labs. But occasionally, the space becomes repurposed or no longer has the requirement of 100% outdoor air and is essentially wasted energy. Below are a list of systems which appear to operate as 100% outdoor air. Please review and ensure that the facility requires 100% fresh air. Otherwise, consider implementing modulating outdoor air dampers and return air systems.

100% outdoor air ventilation is one of the largent energy-wasting systems. Replacing them in areas which do not require 100% outside air could have savings potential of up to X% per year.

Controllers (20)

| Device | Points | Issue |
| --- | --- | --- |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |

FIG. 24

Site Assessment Tool

Dirty Filter

Using static pressure sensors, we can measure the pressure drop across a filter and determine the dirt load on the filter. Static pressure increases of greater than .2-.5 in w.g. indicate the filter may need to be replaced. Dirty filters and increased static pressure causes the fan to work harder and use more energy to get air across it.

Controllers (20)

| Device | Points | Issue |
|---|---|---|
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |

FIG. 25

Site Assessment Tool

U/L Listed Devices

Findings: U/L Listed Devices are used for smoke control. These devices are critical in nature and should not be upgraded.
Liability:
Benefit:

Controllers (20)

| Device | Points | Issue |
|---|---|---|
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |

FIG. 26

Site Assessment Tool

Firmware Vulnerabilities

Firmware version X.X.XX.XXXX has a number of security enhancements, such as:
- Enhancement #1
- Enhancement #2

All previous firmware versions should be upgraded in order to better secure your network.

Controllers (20)

| Device | Points | Issue |
|---|---|---|
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |

FIG. 27

Site Assessment Tool

Economizers

66% of your AHUs do not have an economizer strategy. Because the other 34% of the equipment does, it suggests that the equipment is in a region that could take advantage of such a strategy. Economizer strategies can save up to 10% of a buildings total energy consumption, when implemented properly.

| Top 3 Buildings | Site Total Kwh | Equipment Economized | Potential Savings | Current Economizer Coverage |
|---|---|---|---|---|
| Building A | 123,111 | 30% | $###,### - $###,### | |
| Building B | 765,123 | 60% | $###,### - $###,### | 50% |
| Building C | 456,234 | 61% | $###,### - $###,### | |

\* Represents 30-32% of total campus potential

| Campus Potential | Site Total Kwh | Equipment Economized | Potential Savings | |
|---|---|---|---|---|
| Campus | 111,123,111 | 20% | $###,### - $###,### | 20% |

Controllers (20)

| Device | Points | Issue |
|---|---|---|
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |
| Clinics NAE7v128<br>FeedingRm B17-180<br>VMA-1234<br>ADX-1:507-B1FO-<br>NAE02/N2 Trunk 1.N2-5 | SF-S<br>SF-O | SF-S never goes inactive<br>Always at 100% |

FIG. 28

Site Assessment Tool

Summary

[ Differences ▾ ]

Performance & Savings (7)

[ 6 / 1 ] — 2902
- Scheduling
- Economizer
- Fan Motors
- AHU Supply Fan Static Pressure Reset
- AHU Discharge Air Temp Reset
- 100% Outdoor AHU
- No. of Heating Valves Open Compared to OA-T

Maintenance & Reliability (7)

[ - ] — 2904
- Dirty Filter
- Chiller Operating Hours
- Unbound References
- Improperly Addressed Devices
- Missing Trends
- Alarms/Events
- % Site Exceeding MSEA Recommendations
- Last Backup > 6 months old

Security & Standards (8)

[ 8 / 1 ] — 2906
- Default Password
- All Admin Users
- U/L Listed Devices
- Firmware Vulnerability
- No. of Dormant Accounts
- Point Categorization
- Standard Naming Convention

Comfort & Health

[ 6 / 1 ] — 2908
- AHU Discharge Air Temperature Variation from Setpoint
- AHU Duct Static Pressure Variation from Setpoint
- $CO_2$ Variation from Setpoint?

Site Information

| | |
|---|---|
| Supervisory Devices | +7 |
| Controllers | +125 |
| Total Point Count | +642 |

NAE Firmware Version

Pie chart: 26%, 17%, 9%, 17%, 31%
- ▢ 5.2.0.1000
- ■ 2.2.0.1000
- ▨ 3
- ▦ 4
- ▩ 5

FIG. 29

| Site Assessment Tool |
|---|

Demand Limiting Load Rolling (DLLR)

DLLR strategy limits peak energy usage by monitoring the actual energy usage, comparing it to a user configured tariff structure, then shedding non-critical loads to ensure the optimal usage by avoiding additional cost.

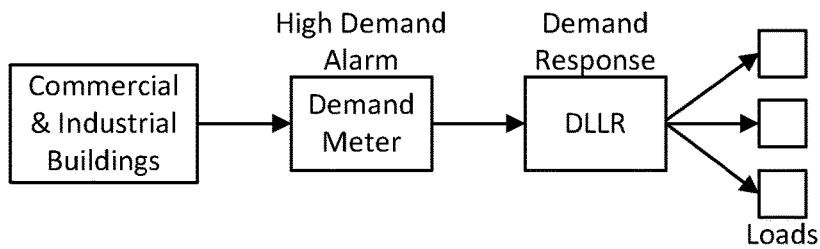

Demand Limiting (DL) selectively turns off equipment, such as fans and lights, or adjusts set points to limit energy use during periods of the day that are traditionally high-usage.

Load rolling (LR) acts continuously to maintain a specified energy reduction by shedding non-critical loads. It helps to reduce overall energy consumption.

For more information on DLLR, click here

Site Assessment Tool
User Views
User views can contain any object in the database, such as schedules, room temps, graphics, etc.
Different users can have specific user views.
Items added to a usr view can be renamed.
Items appearing in user views are a collection of references to the list of all objects
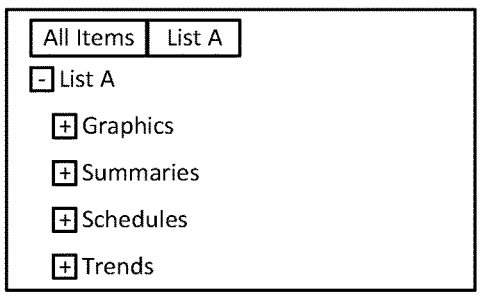 or 
For more information on user views, click here
3300
FIG. 33

PERFORMANCE ASSESSMENT DEVICE FOR MONITORING AND COMPARING ATTRIBUTES OF A BUILDING MANAGEMENT SYSTEM OVER TIME

CROSS-REFERENCE TO RELATED APPLICATION

The present application is a continuation of U.S. patent application Ser. No. 15/289,934, filed Oct. 10, 2016, the entire contents of which is incorporated by reference herein.

BACKGROUND

The present disclosure relates generally to building management systems. The present disclosure relates more particularly to systems and methods for presenting data, and changes to control strategies, associated with a building management systems (BMS).

A building management system (BMS) is, in general, a system of devices configured to control, monitor, and manage equipment in or around a building or building area. A BMS can include a heating, ventilation, and air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include a variety of devices (e.g., HVAC devices, controllers, chillers, fans, sensors, etc.) configured to facilitate monitoring and controlling the building space. Throughout this disclosure, such devices are referred to as BMS devices or building equipment.

Currently, many building management systems provide control of an entire facility, building, or other environment. The building management system may control HVAC systems, water system, lights, air quality, security, and/or any other aspect of the facility within the purview of the building management system. These systems may require skilled persons to adjust, control, and otherwise operate the building management system, due to the complexity. In large facilities or buildings, this management can be labor intensive. Moreover, in buildings where dynamic management of the building management system is required (i.e. buildings with multiple independent HVAC requirements), advanced control strategies may be required along with ongoing preventative maintenance of individual systems within the building management system to adjust for the dynamic use of the building or facility.

Once a BMS system is commissioned and operational at a user site, the generally large size of BMS systems makes verification and assessment of the system's performance difficult. Obtaining performance information regarding the BMS system can be critical in determining if the BMS system is functioning as per its specified design. This information may provide useful insights into the BMS system, such as opportunities for function or performance enhancements. Furthermore, as systems change over time, it is important to monitor and understand how the changes to the BMS system over time have affected the BMS system. For example, as additional devices and data points are added to a BMS system, the overall system performance should be monitored to determine the impact of the changes to the BMS system. Thus, it would be desirous to have a tool available that could easily and efficiently analyze a BMS system, in part or in whole, to evaluate a number of performance metrics, and provide suggestions relating to the optimization of the BMS system.

Furthermore, BMS systems are often modified with new features or devices over time. However, due to the large number of data points, it may be difficult to monitor the changes to the BMS system. Additionally, the performance changes in the BMS due to the modification and or addition of devices and features is also difficult to quickly and easily determine. Providing a comparison of a current performance and inventory of a BMS against the performance and inventory of a BMS from a past point in time may allow a user to see changes in the BMS system over periods of time. This can provide a powerful tracking tool that can be used by a user to evaluate a BMS over time.

Additionally, many BMS system do not fully utilize all of the available features. In some instances, a user may avoid utilizing some features due to perceived complexity or cost. In other examples, new features may be developed for use with a BMS after the initial commissioning is complete. These features may provide powerful tools to a user of the BMS. For example, the features may provide energy and/or cost savings, increase efficiencies, decrease waste and emissions, or generally provide other benefits to the BMS. Accordingly, it would be desirous to have a tool that could provide verification of a BMS system, perform comparisons of devices, features and performance over time, and provide an assessment of the utilization of certain features available within the BMS.

SUMMARY

One implementation of the present disclosure is a performance assessment device for evaluating a building management system (BMS). The device includes a communication interface. The communication interface is configured to communicate with a BMS network, the BMS network in communication with the BMS. The device further includes a processing circuit. The processing circuit is configured to receive data related to the BMS via the communication interface. The processing circuit is further configured to evaluate the data related to the BMS to generate a current assessment of the attributes of the BMS, and to compare the current assessment of the attributes of the BMS to a previously determined assessment of the attributes of the BMS.

A further implementation of the present disclosure is a method for comparing assessment of a building management system (BMS) over time. The method includes generating a current assessment of the BMS and selecting a previously generated assessment of the BMS from a point in time prior to the current assessment of the BMS system. The method further includes comparing the previously generated assessment and the current assessment to determine one or more differences between the previously generated assessment and the current assessment. The method further includes analyzing the differences between the previously generated assessment and the current assessment, and generating a report. The report includes the analysis of the differences between the previously generated assessment and the current assessment.

A further implementation of the present disclosure is a performance assessment system for evaluating a building management system (BMS). The device includes a communication interface and a BMS access device. The BMS device is configured to provide communication between a BMS network and the communication interface. The device further includes a processing circuit. The processing circuit is configured to receive data related to the BMS via the communication interface. The processing circuit is further configured to evaluate the received BMS data to generate a current assessment of the BMS performance, and to compare the current assessment of the BMS performance to a previously determined assessment of the BMS performance.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 8 is a screenshot illustrating a dialog box for generating a new inventory project, according to some embodiments.

FIG. 9 is a screenshot illustrating a file comparison interface, according to some embodiments.

FIG. 11 is a screenshot illustrating an example inventory comparison report, according to some embodiments.

FIG. 12 is a screenshot illustrating a comparison summary report, according to some embodiments.

FIG. 14 is a screen shot illustrating a performance assessment summary, according to some embodiments.

FIG. 17 is a screen shot illustrating a point summary, according to some embodiments.

FIG. 19 is a screen shot illustrating a maintenance and reliability report, according to some embodiments.

FIG. 20 is a screen shot illustrating a security and standards report, according to some embodiments.

FIG. 21 is a screen shot illustrating a detailed scheduling report, according to some embodiments.

FIG. 22 is a screen shot illustrating a detailed motor report, according to some embodiments.

FIG. 23 is a screen shot illustrating an air handling unit reset strategies report, according to some embodiments.

FIG. 24 is a screen shot illustrating a 100% outdoor air handling unit report, according to some embodiments.

FIG. 25 is a screen shot illustrating a dirty filter report, according to some embodiments.

FIG. 26 is a screen shot illustrating a detailed UL listed device report, according to some embodiments.

FIG. 27 is a screen shot illustrating a detailed firmware vulnerabilities report, according to some embodiments.

FIG. 28 is a screen shot illustrating a detailed economizer report, according to some embodiments.

FIG. 29 is a screen shot illustrating a performance comparison report, according to some embodiments.

FIG. 32 is a screen shot illustrating a demand limiting load rolling feature report, according to some embodiments.

FIG. 33 is a screen shot illustrating a user views report, according to some embodiments.

DETAILED DESCRIPTION

Building Management System and HVAC System

Figure 1:
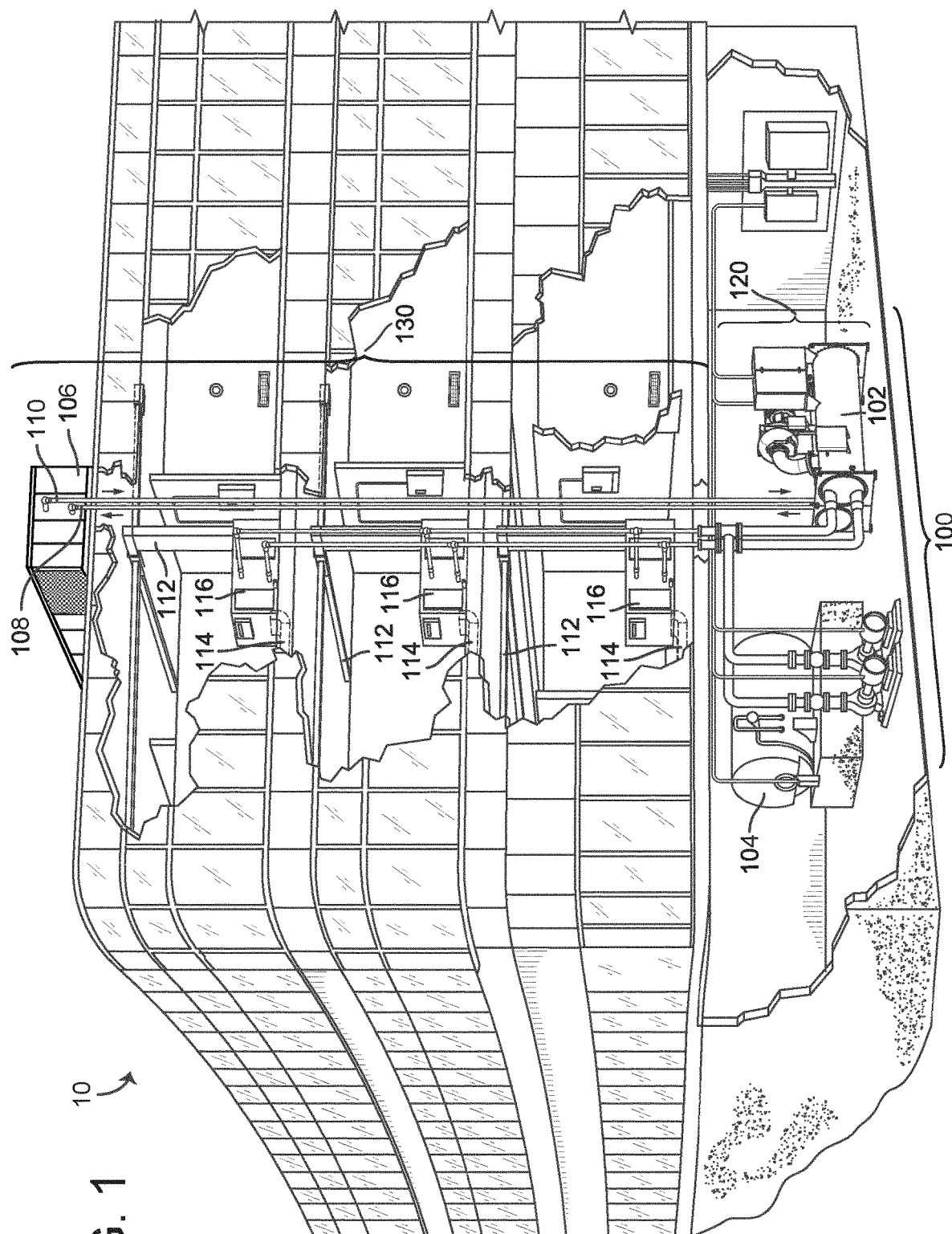
FIG. 1 is a drawing of a building equipped with a building management system (BMS) and a HVAC system, according to some embodiments.

Referring now to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
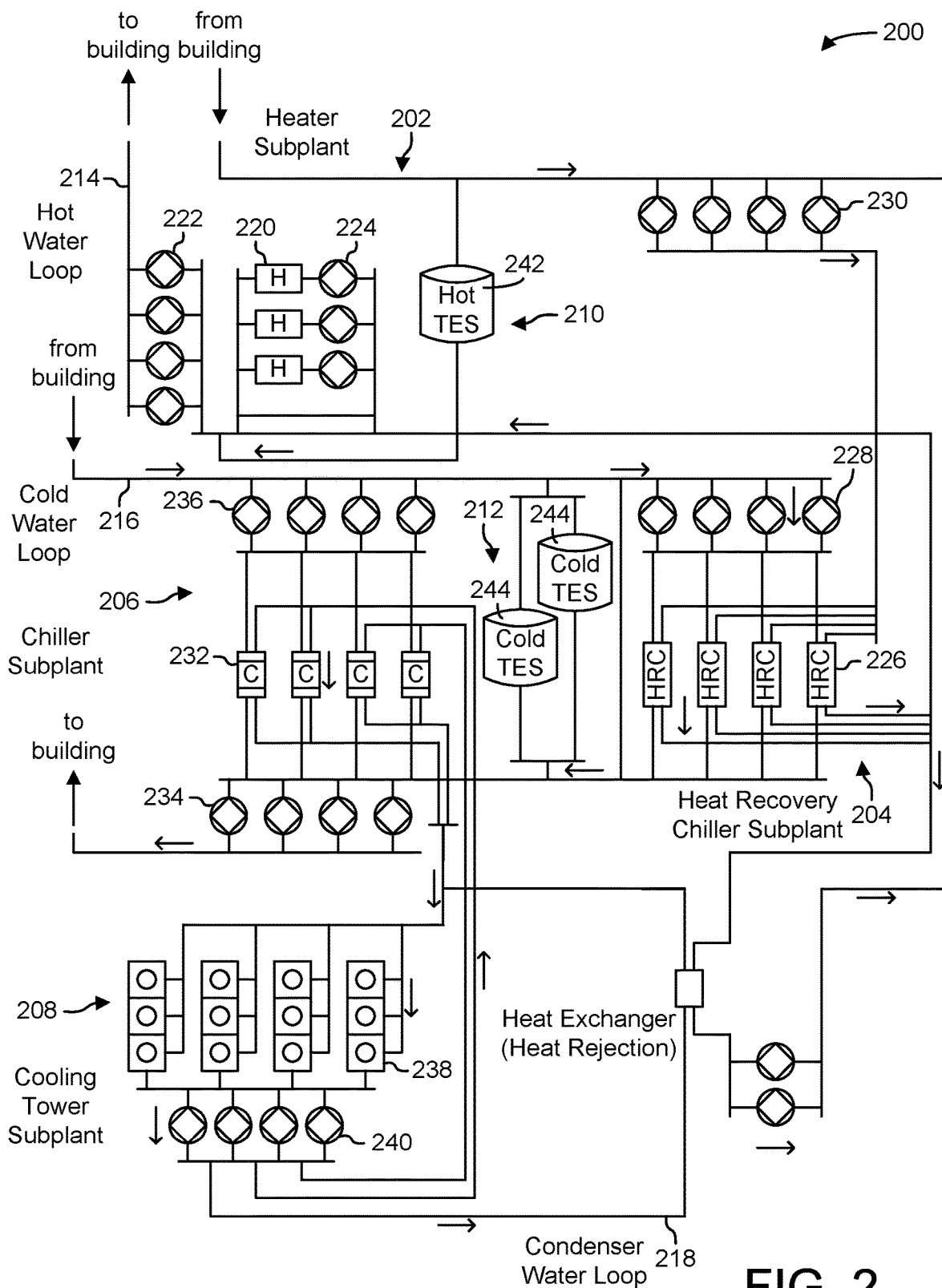
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
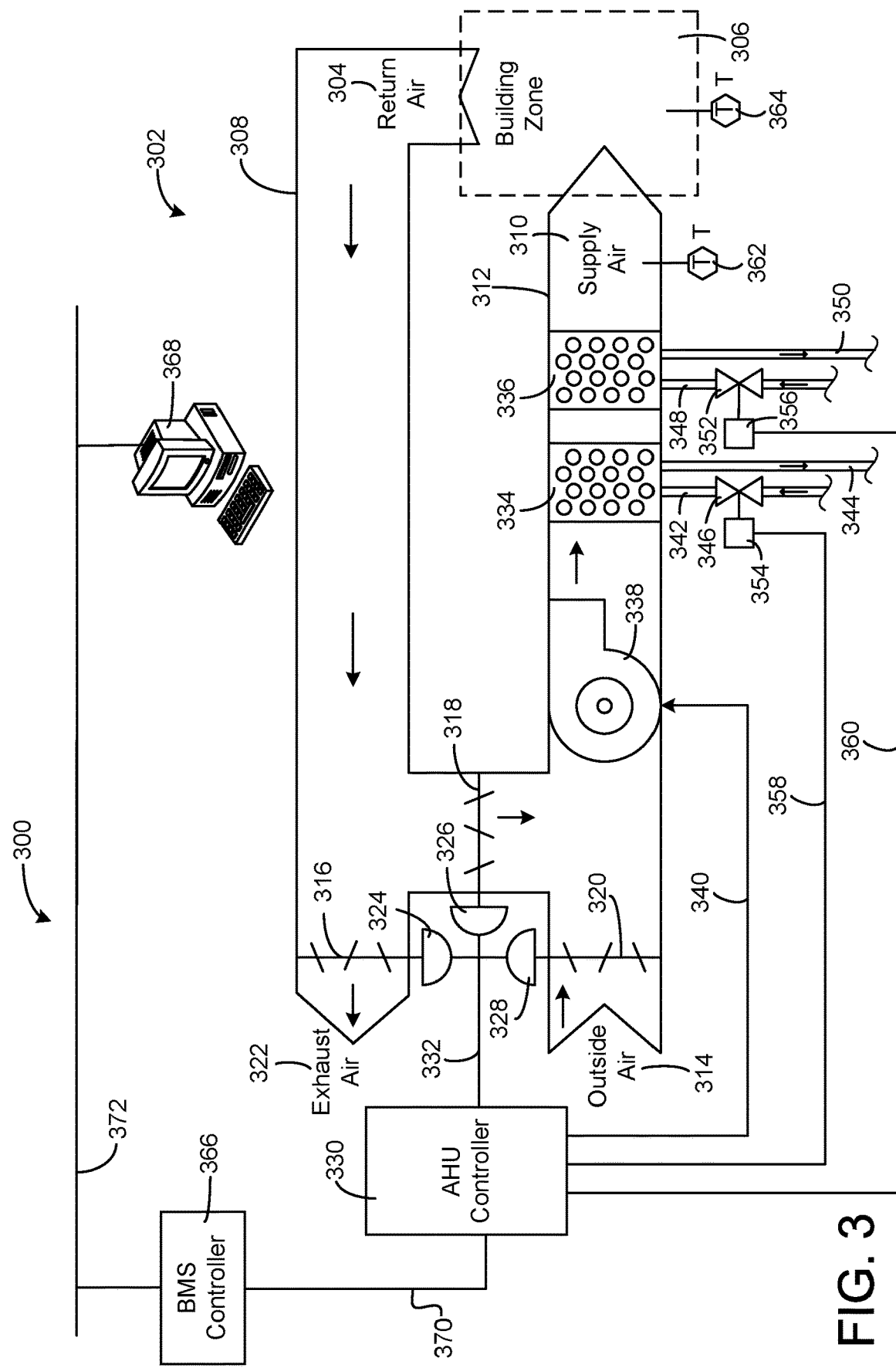
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive Agenth return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of Agenth.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
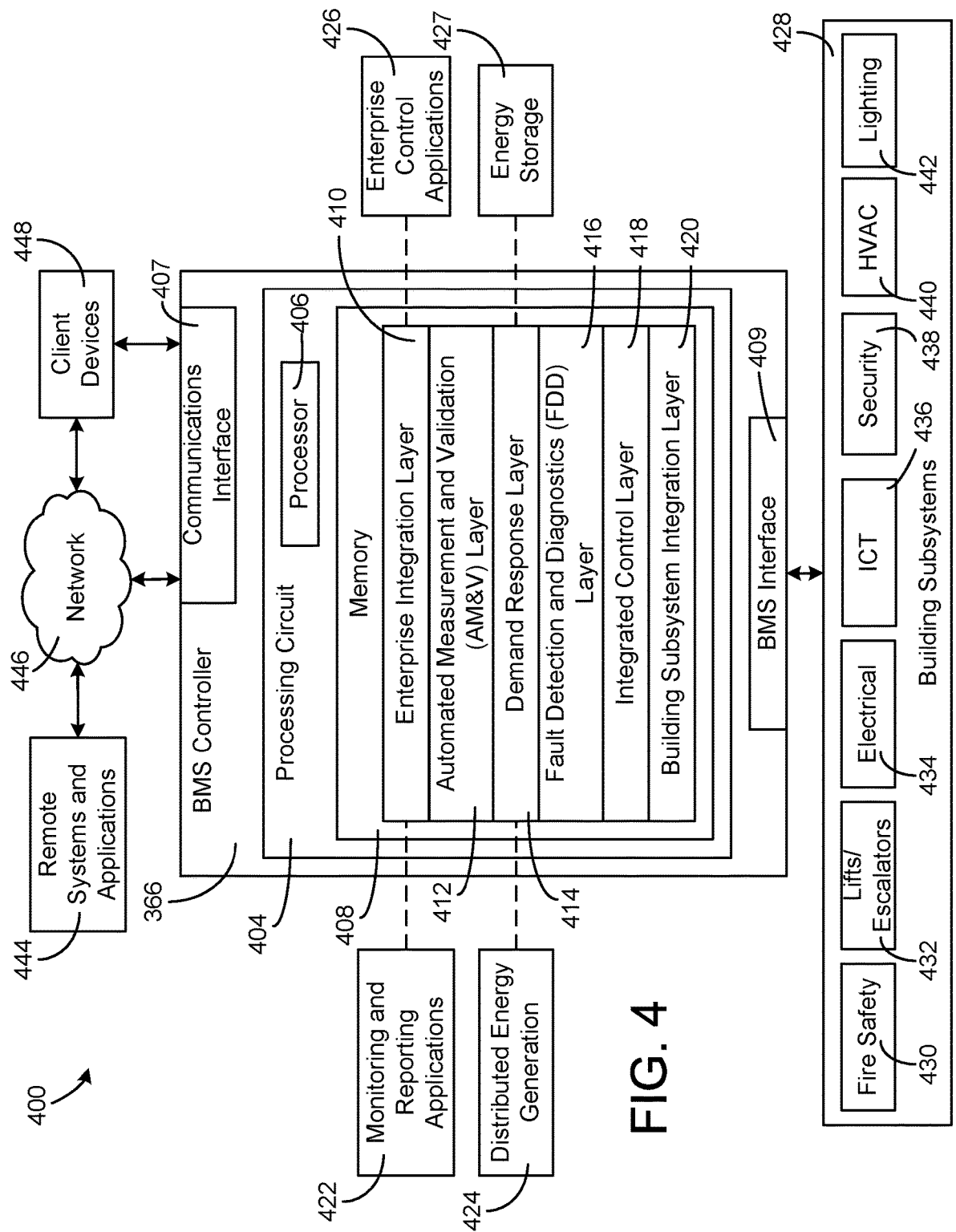
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or Agenth of interfaces 407, 409 can include cellular or mobile phone communications transceivers. In one embodiment, communications interface 407 is a power line communications interface and BMS interface 409 is an Ethernet interface. In other embodiments, Agenth communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem.

Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its set-point. These processes can be examined by FDD layer 416 to expose when the system begins to degrade in performance and alert a user to repair the fault before it becomes more severe.

BMS Performance Assessment Tool

The BMS, as described above, has multiple individual components within the BMS. Example components may include control devices, such as field equipment controllers (FECs), advanced application field equipment controllers (FAC), network control engines (NCEs), input/output modules (IOMs), and variable air volume (VAV) modular assemblies. However, other control device types are contemplated. Further, the BMS may include equipment such as actuators, valves, AHUs, RTUs, thermostats, or any other device associated with the BMS, which are controlled by the control devices described above. In some examples, these devices may be monitored using a centralized monitoring tool, such as a controller configuration tool (CCT) from Johnson Controls. However, other monitoring tools are contemplated.

Figure 5:
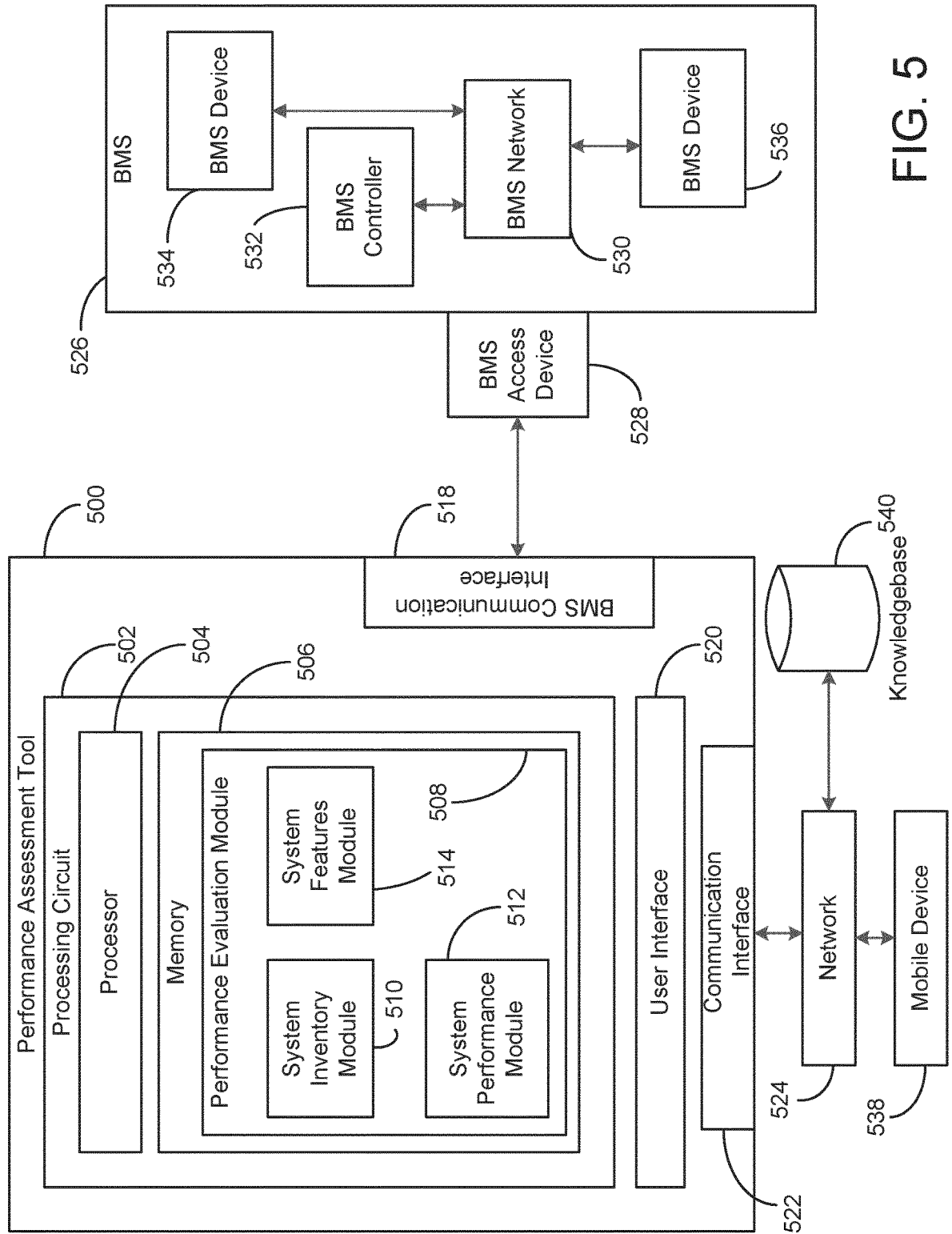
FIG. 5 is a block diagram illustrating a performance assessment tool, according to some embodiments.

Referring now to FIG. 5, a block diagram showing a performance assessment tool 500 is provided, according to some embodiments. The performance assessment tool 500 is shown to include a processing circuit 502. The processing circuit 502 includes a processor 504 and a memory 506. The processor 504 may be a general purpose or specific purpose processor, an application specific integrated circuit (ASIC), one or more field programmable gate arrays (FPGAs), a group of processing components, or other suitable processing components. The processor 504 may be configured to execute computer code or instructions stored in the memory 506 or received from other computer readable media (e.g., CDROM, network storage, a remote server, etc.).

The memory 506 may include one or more devices (e.g., memory units, memory devices, storage devices, etc.) for storing data and/or computer code for completing and/or facilitating the various processes described in the present disclosure. The memory 506 may include random access memory (RAM), read-only memory (ROM), hard drive storage, temporary storage, non-volatile memory, flash memory, optical memory, or any other suitable memory for storing software objects and/or computer instructions. The memory 506 may include database components, object code components, script components, or any other type of information structure for supporting the various activities and information structures described in the present disclosure. The memory 506 may be communicably connected to the processor 504 via processing circuit 502 and may include computer code for executing (e.g., by processor 504) one or more processes described herein.

The memory 506 may include a performance evaluation module 508. The performance evaluation module 508 may include a number of additional modules, such as a system inventory module 510, a system performance module 512, and a system feature module 514. The performance assessment tool 500 may further include a BMS communication interface 518, a user interface 520, and a communication interface 522 for communicating with a network 524.

In one embodiment, the performance assessment tool 500 receives data from a BMS 526 via the BMS communication interface 518. In one example, the BMS communication interface 518 may access the BMS via a BMS access device 528. The BMS interface device 528 may be any type of BMS interface device. In one embodiment, the BMS interface device 528 is a mobile access point (MAP) device, such as a MAP Gateway device by Johnson Controls. In other embodiments, the BMS interface device 528 may be a Metasys server from Johnson Controls. The BMS access device 528 may be configured to collect data from the BMS 526, and may provide this data to the performance assessment tool 500 upon request. In one embodiment, the BMS access device 528 may be configured to receive a request for data from the performance assessment tool 500 and access the BMS 526 to collect the requested data. The requested data may be point data, object data, etc. However, other devices with access to a BMS network 530 within the BMS 526 are also contemplated, such as smart thermostats, dedicated BMS controllers, home hubs, or other connected devices. The BMS communication interface 518 may provide a communication link to the BMS 526. In one embodiment, the communication interface 518 is a serial interface, such as RS-232 or RS-485. In some examples, the BMS communication interface 518 may be a wireless interface such as a cellular (3G, 4G, CDMA, LTE, etc.) interface, a Wi-Fi interface, a Zigbee interface, a Bluetooth interface, a LoRa interface, etc. In other example, the BMS communication interface 518 may be other wired interfaces such as USB, Firewire, Lightning Connections, CAT5 (wired Ethernet), etc.

The BMS 526 may include a BMS network 530, one or more BMS controllers 532, and a number of BMS devices, such as BMS devices 534, 536. The BMS controller 532, and the BMS devices 534, 536 may be any of the controller or devices as described above in regards to FIGS. 1-4, above. In one example, the BMS network 530 may provide communication between the BMS controller 532, the BMS devices 534, 536 and the BMS access device 528. In one embodiment, the BMS network 530 is a BACnet network. In other embodiments, the BMS network 530 is an EthernetIP network. Alternatively, the BMS network 530 may be any other type of BMS network, as applicable.

In one embodiment, the performance assessment tool 500 is a web-based tool. For example, the performance assessment tool 500 may be hosted on a server, and accessed via a connection to the network 524 via the communication interface 522. In some examples, network 524 may be a local network such as a local area network (LAN), or a wide area network (WAN). In other examples, the network 524 may be an internet based network, which may allow a user to access the performance assessment tool 500 using a web browser, such as an HTML web browser. In other embodiments, the performance assessment tool 500 may be hosted on a server and accessed using a thin-client. In some embodiments, a user may be able to access the performance assessment tool 500 using a mobile device 538 having a connection to the network 524. For example, mobile devices such as smartphones (iPhone, Android phone, Windows phone, etc.), tablet computers (iPad, Android tablet, Windows Surface, etc.), mobile computers (laptops, netbooks), stationary computers (PCs), or dedicated devices having a network interface which may be used to access the network 524. Dedicated devices may include smart thermostats, dedicated BMS controllers, home hubs, or access point devices such as a mobile access point (MAP) device from Johnson Controls. In other embodiments, the performance assessment tool 500 may be loaded onto a thick-client device, such as a laptop, personal computer (PC), or other computing device which can communicate with the BMS 526. In some examples, where the performance assessment tool 500 is loaded onto a thick-client device, a user may access the tool via the user interface 520. For example, the user interface 520 may be a user interface of the thick-client device.

In one embodiment, the system inventory module 510 may be configured to access the BMS 526 via the BMS communication interface 518 and generate an inventory list of all devices associated with the BMS 526. This inventory may include all devices, controllers, communication devices, access points, or any other portion of the BMS 526. The generation of inventory lists using the system inventory module 510 will be described in more detail below. In one embodiment, the system performance module 512 is configured to access the BMS 526 via the BMS communication interface 518 and to retrieve information related to the performance of the BMS 526. The system performance module 512 may further analyze the data retrieved from the BMS 526 to generate one or more BMS performance reports, as described in further detail below. In a further embodiment, the system features module 514 is configured to access the BMS 526 via the BMS communication interface 518 and to retrieve information related to features associated with the BMS 526.

In one embodiment, the performance assessment tool 500 may be in communication with a knowledgebase 540. The knowledgebase 540 may be accessed by the performance assessment tool 500 via the network 524. The knowledgebase 540 may include information required by the performance assessment tool 500 to accurately perform the performance verification processes, as described below. In one embodiment, the knowledgebase 540 may include existing specifications for a number of BMS systems. The knowledgebase 540 may further include facility data from locations where the BMS systems are installed. Facility data may include physical plant schematics, riser diagrams, installed components, maintenance records, service contracts, etc. The knowledgebase 540 may further include historical data such as prior performance assessments, inventory assessments or feature assessments, as described in detail below. In one embodiment, the knowledgebase 540 may be a central repository for all data collected via one or more performance assessment tools.

Figure 6:
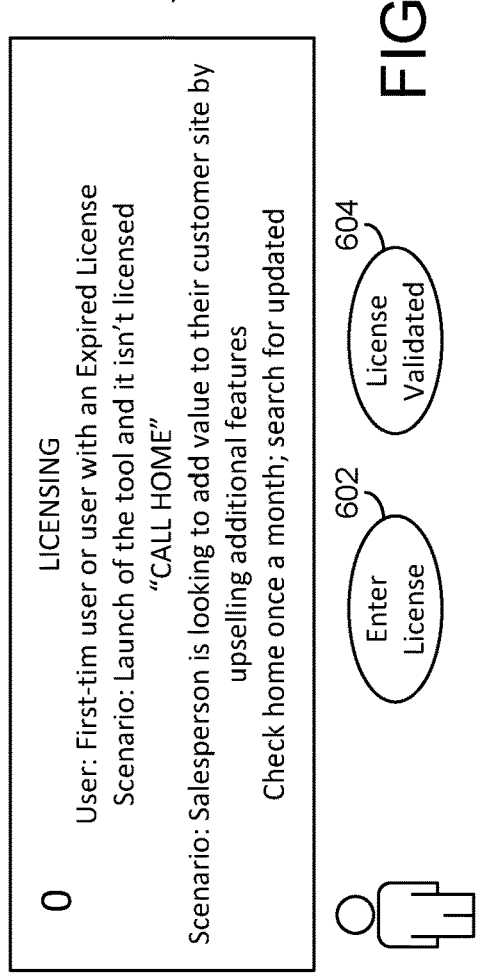
FIG. 6 is a flow chart illustrating a licensing process for a performance assessment tool, according to some embodiments.

Turning now to FIG. 6, a flow chart illustrating a licensing process 600 for a performance assessment tool 500 is shown, according to some embodiments. In one embodiment, the performance assessment tool 500 is the performance assessment tool 500 described above. At process block 602, a user may enter a license for the performance assessment tool 500. In some embodiments, the user may be prompted by the performance assessment tool 500 to provide the license when the performance assessment tool 500 is first launched. In other embodiments, the user may be prompted to enter a license whenever the performance assessment tool 500 is used in a new BMS. In still further embodiments, the user may be prompted to enter a license every time the performance assessment tool 500 is activated. Once the license is entered at process block 602, the license is validated at process block 604. In one example, the user may be instructed to contact an administrator if the entered license is unable to be validated.

Figure 7:
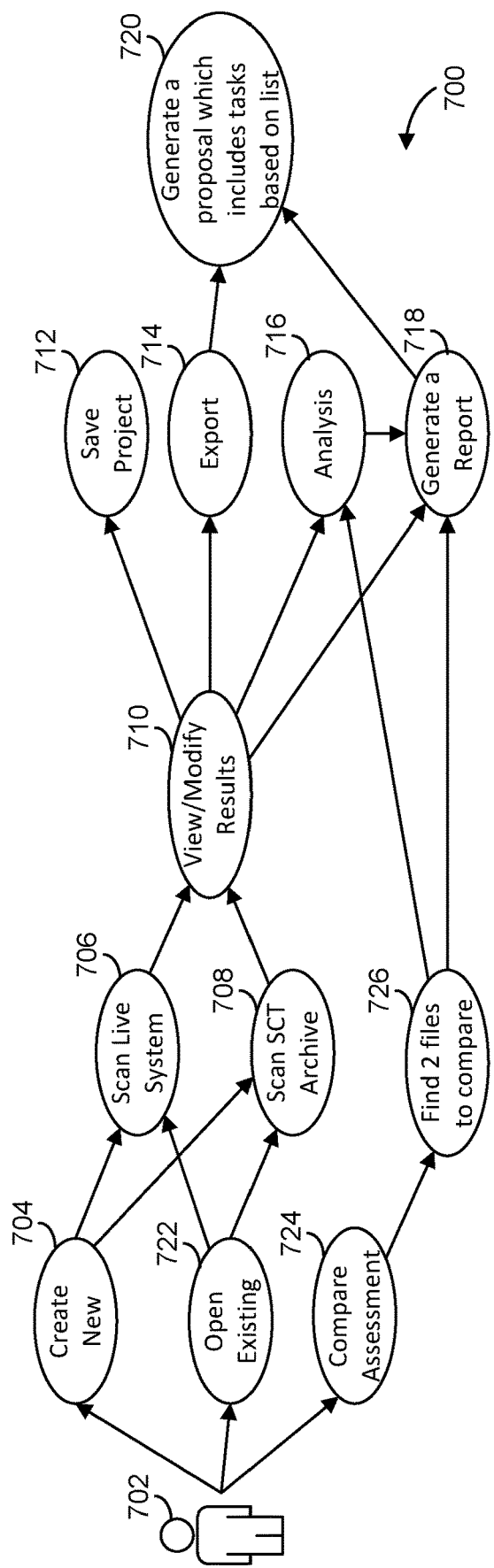
FIG. 7 is a flow chart illustrating a system inventorying process, according to some embodiments.

Turning now to FIG. 7, a flow chart illustrating a system inventorying process 700 is shown, according to some embodiments. As shown in FIG. 7, a user 702, may select an option to initiate the system inventorying process 700 by creating a new inventory project at process block 704. Turning briefly to FIG. 8, a screen shot of the performance assessment tool 500 is shown illustrating a dialog box 800 for generating a new inventory project. The dialog box 800 may have a project name input 802, a branch input 804, and a field technician name input 806. The project name input 802 may be used to provide a unique identifier for the project. The branch input 804 may be used to provide an indication as to what BMS, and/or what portion of a BMS is being evaluated. Additionally, the field technician name input 806 may be used to enter the name of the field technician generating the project.

Returning now to FIG. 7, once the user 702 has created the new inventory project, the performance assessment tool 500 may scan the live BMS system at process block 706. In one embodiment, the performance assessment tool 500 may query the BMS system to request information related to every device or component within the BMS. In other embodiments, the performance assessment tool 500 may query the BMS system to request information related to a portion of the BMS system to be evaluated. The performance assessment tool 500 may further scan an archive associated with the BMS system being scanned at process block 708. In one embodiment, the archive is stored in the knowledgebase 540. However, in other examples, the archive may be stored in the memory 506 of the performance assessment tool 500. By scanning the archive, the performance assessment tool 500 may be able to determine if previous inventory projects had been created for the given BMS system. At process block 710, the results of the inventory project may be presented to the user 702. In one embodiment, the results may be presented in a list form. In other embodiments, the results may be displayed to a user visually, such as via a connection diagram. Once the results are presented to the user 702, the user 702 may instruct the performance assessment tool 500 to perform multiple operations. In one embodiment, the user may instruct the performance assessment tool 500 to save the project at process block 712. In a further embodiment, the user 702 may instruct the performance assessment tool 500 to export the results at process block 714. For example, where the results are in list form, the results may be exported to a spreadsheet, such as a Microsoft Excel spreadsheet. In other examples, the results may be exported to a graphics program, such as Microsoft Visio, where the results are in a visual form. Further, additional programs are contemplated, as well as exporting to multiple programs at once.

In a further embodiment, the user 702 may instruct the performance assessment tool 500 to analyze the results at process block 716. In one embodiment, the system inventory module 510 of the performance assessment tool 500 may be used to analyze the results provided in process block 710. The analysis may include determining firmware versions are installed on the devices of the BMS, and determining if they are out of date, evaluating when the last maintenance was performed on the devices within the BMS, determining when the last database backup of a BMS occurred, evaluating if any devices within the BMS are outdated or obsolete, and/or other analysis requested by the user 702. Once the analysis is completed, the user 702 may instruct the performance assessment tool 500 to generate a report at process block 718. In one embodiment, the report may include information determined during the analysis at process block 716. In a further embodiment, the user 702 may instruct the performance assessment tool 500 to generate a report at process block 718 based on the result provided at process block 710.

Figure 10:
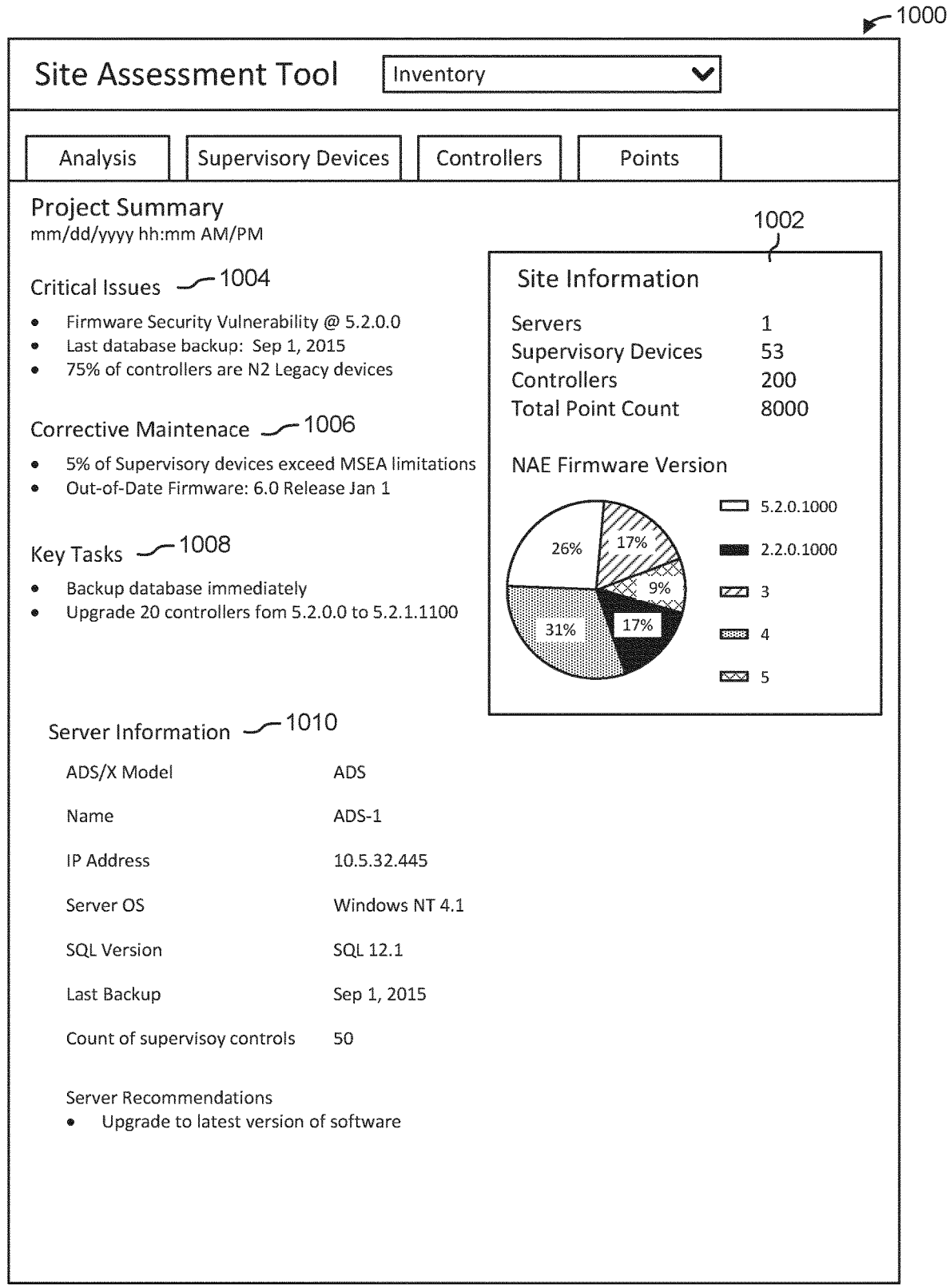
FIG. 10 is a screen shot illustrating an example inventorying report, according to some embodiments.

Turning now to FIG. 10, a screen shot of the performance assessment tool 500 is shown illustrating an example report 1000. In one embodiment, the report 1000 may include one or more statuses of the BMS being analyzed. For example, the report may include a site information portion 1002. The site information portion 1002 may provide general status information about the BMS being analyzed, such as number of servers, supervisory devices, controllers, and data points in the scanned BMS. The site information portion 1002 may further include information related to the firmware of the various devices in the BMS. For example, the site information portion 1002 indicates the firmware versions associated with a number of network automation engine (NAE) controllers in the BMS. The report 1000 may further include a critical issues portion 1004, a corrective maintenance portion 1006, and a key tasks portion 1008. The critical issues portion may provide a list of all the issues determined to be critical during the analysis. The corrective maintenance portion 1006 may provide general information related to corrective maintenance required to fix issues identified during the analysis. Finally, the key tasks portion 1008 may provide information to a user regarding actions that need to be taken to address the identified critical issues. Finally, the report 1000 may include a server information portion 1010, which may provide information relating to a server within the BMS. While the above report is shown with the above described portions, it is contemplated that the reports may be user configurable to include more information or less information, as desired by the user.

Once the report has been generated at process block 718, the user 702 may instruct the performance assessment tool 500 to generate a proposal at process block 720. The proposal may format the information provided in the report generated at process block 718 to be provided to a customer. The proposal may include additional information from the report, such as potential costs, potential savings, timelines, etc. In an alternate embodiment, the user may instruct the performance assessment tool 500 to generate the proposal at process block 720 upon exporting the results at process block 714. The generated proposal may include information related to the unanalyzed results provided at process block 710 in a format suitable for presentation to a customer or other end user.

The user 702 may further instruct the performance assessment tool 500 to open an existing inventory project at process block 722. The user may select a previously created inventory project stored in the memory 506 of the performance assessment tool 500. For example, the user 702 may select a previously created inventory project stored in the memory 506 to update a previously performed inventory project with updated system information. Once the user 702 opens the existing inventory project, the process 700 may follow the steps described above for when the user 702 creates a new inventory project. Specifically, the process can scan the live BMS system at process block 706, as well as scan an archive at process block 708. The results can be presented at process block 710, and a user may then instruct the performance assessment tool 500 to save the project at process block 712, export the results at process block 714, analyze the results at process block 716 and/or generate a report at process block 718. Further, the user may instruct the performance assessment tool 500 to generate a proposal based on either the analyzed results or the unanalyzed results as described above. In one embodiment, the performance assessment tool 500 may save the project outputs (e.g. results, reports and/or proposals) in a new file, to allow for future comparison.

In a further embodiment, the user 702 may instruct the performance assessment tool 500 to perform a comparison assessment at process block 724. The comparison assessment may provide a comparison in time between two or more previously generated inventory projects. In one embodiment, the comparison assessment may compare the results between two or more sets of previously generated results sets for a given BMS. At process block 724, the user 702 can select two or more files to compare. Turning briefly now to FIG. 9, a dialog box illustrating a file comparison interface 900 is shown, according to some embodiments. As shown in FIG. 9, the user may select a first project file using the first project file input 902, and a second project file using the second project file input 904. The first project file may be a current assessment of the BMS, or a previously generated assessment of the BMS. The user may then select what type of comparison is desired (i.e. inventory) using the compare type input 906. Returning now to FIG. 7, once the user 702 selects the files to be compared at process block 724, user 702 can instruct the performance assessment tool 500 to perform an analysis at process block 716. The analysis may determine all differences in the inventory of the BMS between the two selected files. Once the analysis is completed, the user may instruct the performance assessment tool 500 to generate a report at process block 718. In some embodiments, the user 702 may instruct the performance assessment tool 500 to generate the report at process block 718 once the two files are selected for comparison. This may generate a report including a basic comparison between the two files.

In one embodiment, the user 702 may instruct the performance assessment tool 500 to generate a system comparison report at process block 718. An example system comparison report 1100 is shown in FIG. 11. The report 1100 may include a first inventory report portion 1102 and second inventory report portion 1104. The first inventory report portion 1102 and the second inventory report portion may allow the user 702 to compare the critical issues, preventative maintenance, key tasks, server information and site information between the two inventory reports. In one embodiment, the comparison report compares two inventory reports at two different points in time. For example, the first inventory report portion 1102 may be a current inventory of the system, and the second inventory report portion may reflect an inventory of the system from one year prior. In some embodiments, the user 702 can specify the period of time for the comparison. It is contemplated that more information or less information may be provided in the report 1100. For example, the user 702 may be able to specify what information is required to be shown in the report.

Turning now to FIG. 12, a comparison summary report 1200 is shown, according to some embodiments. The comparison summary report 1200 may include a site information portion 1202. The site information portion 1202 may show only the differences from an earlier inventory project. As shown in the site information portion 1202, it is shown that the supervisory devices have increased by seven, the number of controllers has increased by one hundred and twenty-five, and the total point count has increased by six hundred and forty-two. This can provide the user 702 with a quick understanding on the changes in the BMS system since the last inventory project was run, or the changes between the BMS system inventory at two points in time. Further, a critical issues portion 1204, a preventative maintenance portion 1206, and a key tasks portion 1208 may further show the differences between the critical issues, the preventative maintenance requirements, and the keys tasks between BMS inventory reports generated at two different points in time. For example, the critical issues portion 1204 may describe the changes in any critical issues between the inventory projects, such as a "2% increase in supervisory devices exceeding MSEA limitations." Similar to the comparison report 1100, the comparison summary report 1200 may show the changes in a system inventory over a period of time. For example, the comparison summary report may show the changes in the inventory of the system over the course of one year. However, in other embodiments, the user 702 can specify the period of time over which the comparison is performed.

Returning now to FIG. 7, once the report has been generated at process block 718, the user may instruct the performance assessment tool 500 to generate a proposal at process block 720. The proposal may include the information contained in the generated reports presented in a format appropriate for presenting to a customer or end user. The inventorying process 700 may be used to verify that the BMS systems has been properly installed or commissioned. In some embodiments, the inventorying process 700 is used to verify that any additions to the BMS are properly installed. In further embodiments, the inventorying process 700 is used to provide user with multiple reports showing the changes to a system over time. These changes may be used to determine what optimizations, improvements, or additional maintenance is needed in the system.

Figure 13A:
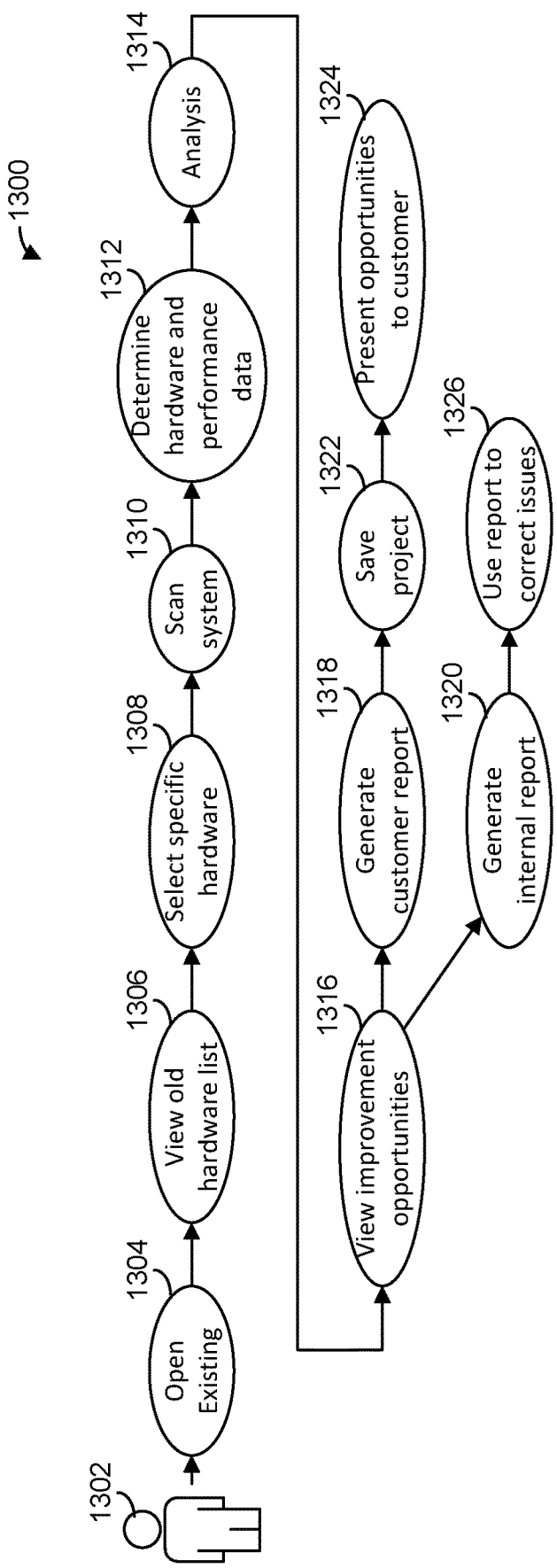
FIG. 13A is a flow chart illustrating a system performance assessment process, according to some embodiments.

Turning now to FIG. 13A, a flow chart illustrating a system performance assessment process 1300 is shown, according to some embodiments. A user 1302 may initiate the process by opening an existing project at process block 1304. The project may be an inventory project as described above. The process may then provide an existing hardware list to the user 1302 at process block 1306. The user 1302 may then select specific hardware within the BMS system from the list of existing hardware at process block 1308. In one embodiment, the user 1302 may select all the hardware related to a specific area of the BMS system. For example, the user 1302 may select all of the hardware associated with a specific building or area controlled by the BMS. In other examples, the user 1302 may select all of the hardware associated with a particular system or sub-system within the BMS.

Once the user 1302 has selected the specific hardware to be analyzed at process block 1308, the process 1300 may scan the live system at process block 1310. In one embodiment, the system is scanned using a performance assessment tool, such as performance assessment tool 500 described above. In other embodiments, the performance assessment tool 500 instructs another device, such as the BMS access device 528 described above, to scan the system. For example, the performance assessment tool 500 may communicate with a Metasys server to perform the specific actions required to collect the data from the BMS based on the scans the user selected. The system may then be scanned to retrieve one or more attributes and/or parameters associated with the hardware components selected at process block

1308. Example attributes may include firmware status, backup status, model number, associated devices, etc. Example parameters may include filter status, motor current values, optimization parameters active, air pressure values, etc. Once the system has been scanned at process block 1310, an updated hardware list and associated performance information may be determined based on the received attributes and/or parameters for multiple aspects of the BMS, at process block 1312. The performance information may include general performance data, such as equipment operating schedules, motor status, set points, general operation, etc. Further, other performance information may include maintenance and reliability data such as filter statuses, equipment operating hours, alarms, improper device addressing, missing trends, backup status, and the like. Further performance information may include security and standards data, such as number of administrative users, number of default passwords in use, U/L listed devices, known firmware vulnerabilities, number of dormant accounts, point categorization, and the like. Still further performance information may include comfort and health data, such as temperature variations from setpoints, pressure variations from setpoints, CO2 variations from setpoint, and the like.

In one embodiment, the updated hardware list and/or the associated performance information is provided to the user via the user interface 520 of the performance assessment tool 500. In other embodiments, the updated hardware list and/or the associated performance information is provided to the user on a mobile device, such as mobile device 538. For example, the performance assessment tool 500 may transmit the updated hardware list and/or the associated performance information to the mobile device 538 via the network 524. In some embodiments, the updated hardware list and/or the associated performance information is provided to the user in a table format. For example, the data may be provided to the user in a spreadsheet format, such as a Microsoft Excel table.

The process 1300 may then perform an analysis of the system based on the updated hardware list and associated performance info provide to the user 1302 at process block 1314. In one embodiment, the analysis is performed by the system performance module 512 of the performance assessment tool 500. The analysis may include analyzing the performance data to determine one or more performance metrics associated with the BMS. The performance metrics may be provided for various aspects of the BMS, such as performance and savings, maintenance and reliability, security and standards, comfort and health, or the like. In some examples, the performance metrics may be provided for various systems or subsystems within the BMS. For example, the performance metrics may be associated with an entire campus, one or more building located on the campus, and/or one or more areas within the building. Similarly the performance metrics may be associated with systems such as lighting, HVAC, etc. Examples of other portions of the BMS associated with the performance metrics are further described in the performance assessment summary report described below.

In one embodiment, the metrics include numerical scores associated with the performance one or more aspects of the BMS. The numerical scores may represent a general level of performance of the BMS. In some examples, the numerical scores can be determined based on benchmarked scores from other BMS systems. For example, the knowledgebase 540 may include performance data for multiple BMS systems. The performance metrics may therefore determine the numerical scores associated with the performance of the aspects of the BMS based on comparing the performance of the BMS 526 to the performance of one or more similar BMS systems. In other embodiments, the numerical scores may be determined based on predetermined scoring criteria. In some examples, the predetermined scoring criteria may be set by a user associated with the BMS 526. In other examples, the predetermined scoring criteria may be a defined algorithm programmed into the performance assessment tool 500. In one embodiment, the predetermined scoring criteria is based on previous analysis of various BMS systems. The predetermined scoring criteria may be stored in the memory 506 of the performance assessment tool 500.

Additionally, the performance assessment tool 500 may analyze the performance data and the associated hardware devices to generate improvement opportunities related to the BMS. Example improvement opportunities may include backing up the system database, upgrading firmware associated with various controllers, replacing filters, properly addressing devices, correctly binding references within the BMS, etc. The improvement opportunities may further include: modifications to equipment operation schedules, utilization of economizer strategies, reducing a number of administrative users, proper sizing of motors, modification or AHU reset strategies, and/or additional feature utilization. The above list is exemplary only, and it is considered that additional improvement opportunities may be provided based on the individual BMS being analyzed.

In one embodiment, the performance assessment tool 500 may communicate with a knowledgebase, such as knowledgebase 540, to access information relating to the analysis of the system. The knowledgebase 540 may include data relating to performing an analysis in general. In other embodiments, the knowledgebase 540 may contain historical data from previous analysis performed, which may be used by the performance assessment tool 500 to conduct the analysis at process block 1314. In further embodiments, the knowledgebase 540 may further contain performance data associated with one or more other BMS systems. Further, the performance assessment tool 500 may provide the results of the analysis, as well as the gathered data from process block 1314, to the knowledgebase 540.

At process block 1316, the analysis results are provided to the user 1302. In one embodiment, the analysis results include the improvement opportunities determined during the analysis, along with the hardware list and performance information presented at process block 1312. Turning now to FIG. 14, a screen shot of the performance assessment tool 500 illustrating a performance assessment summary 1400 is shown, according to some embodiments. The performance assessment summary 1400 may include a site information portion 1402. The site information portion 1402 may include a summary overview of the system, or portion of the system being analyzed. The performance assessment summary 1400 may further include a performance and savings summary 1404, a maintenance and reliability summary 1406, a security and standards summary 1408, and a comfort and health summary 1410.

The performance and savings summary 1404 may include data related to various system performance items, as well as potential savings that may be available. For example, the performance and savings summary 1404 may include data related to scheduling, economizers, fan motors, AHU supply fan static pressure resets, AHU discharge air temp resets, 100% outdoor AHU, and number of heating valves open compared to other systems. The performance and savings summary 1404 may further include a performance and savings system score 1412. The performance and savings system score 1412 may provide a numerical score indicating the determined performance and savings associated with the system. In one embodiment, the numerical score may be between one and ten, with ten representing the best score for a system. However, other scoring schema are also considered. For example, the performance and savings score 1412 may be an alphabetical rating system (e.g. A, B, C, D, F). In further embodiments, the performance and savings system score 1412 may be highlighted to provide a visual indication of the overall score. For example, red may indicate a poor performance score, yellow a neutral performance score, and green a high performance score.

The maintenance and reliability summary 1406 may include data related to the maintenance and reliability of various devices within the system. For example, the maintenance and reliability summary 1406 may provide data related to required or suggested maintenance, data available, etc. Example data may include dirty filter data, chiller operating hours data, unbound references data, improperly addressed devices data, missing trends data, alarms/events data, % site exceeding MSEA recommendations data, and/or last backup of the system. The maintenance and reliability summary may further include a maintenance and reliability score 1414. The maintenance and reliability score 1414 may provide a numerical score indicating the determined performance and savings associated with the system. In one embodiment, the numerical score may be between one and ten, with ten representing the best score for a system. However, other scoring schema are also considered. For example, the maintenance and reliability score 1414 may be an alphabetical rating system (e.g. A, B, C, D, F). In further embodiments, the maintenance and reliability score 1414 may be highlighted to provide a visual indication of the overall score. For example, red may indicate a poor performance score, yellow a neutral performance score, and green a high performance score.

The security and standards summary 1408 may include data related to security and standards items associated with the system. For example, the security and standards summary 1408 may include data related to default password usage, number of administrative users, U/L listed devices, firmware vulnerabilities, number of dormant accounts, point categorization, and standard naming conventions. However, additional data points are contemplated. The security and standards summary 1408 may further include a security and standards score 1416. The security and standards score 1416 may provide a numerical score indicating the determined performance and savings associated with the system. In one embodiment, the numerical score may be between one and ten, with ten representing the best score for a system. However, other scoring schema are also considered. For example, the security and standards score 1416 may be an alphabetical rating system (e.g. A, B, C, D, F). In further embodiments, the security and standards score 1416 may be highlighted to provide a visual indication of the overall score. For example, red may indicate a poor performance score, yellow a neutral performance score, and green a high performance score.

Finally, the comfort and health summary 1410 may include data related to the comfort and health of the system. For example, the comfort and health summary 1410 may include data related to discharge air temperature variations from the setpoint; duct static pressure variations from the setpoint, and CO2 variations form the setpoint. However, additional data points are contemplated. The comfort and health summary 1410 may further include a comfort and health score 1418. The comfort and health score 1418 may provide a numerical score indicating the determined performance and savings associated with the system. In one embodiment, the numerical score may be between one and ten, with ten representing the best score for a system. However, other scoring schema are also considered. For example, the comfort and health score 1418 may be an alphabetical rating system (e.g. A, B, C, D, F). In further embodiments, the comfort and health score 1418 may be highlighted to provide a visual indication of the overall score. For example, red may indicate a poor performance score, yellow a neutral performance score, and green a high performance score.

Figure 15:
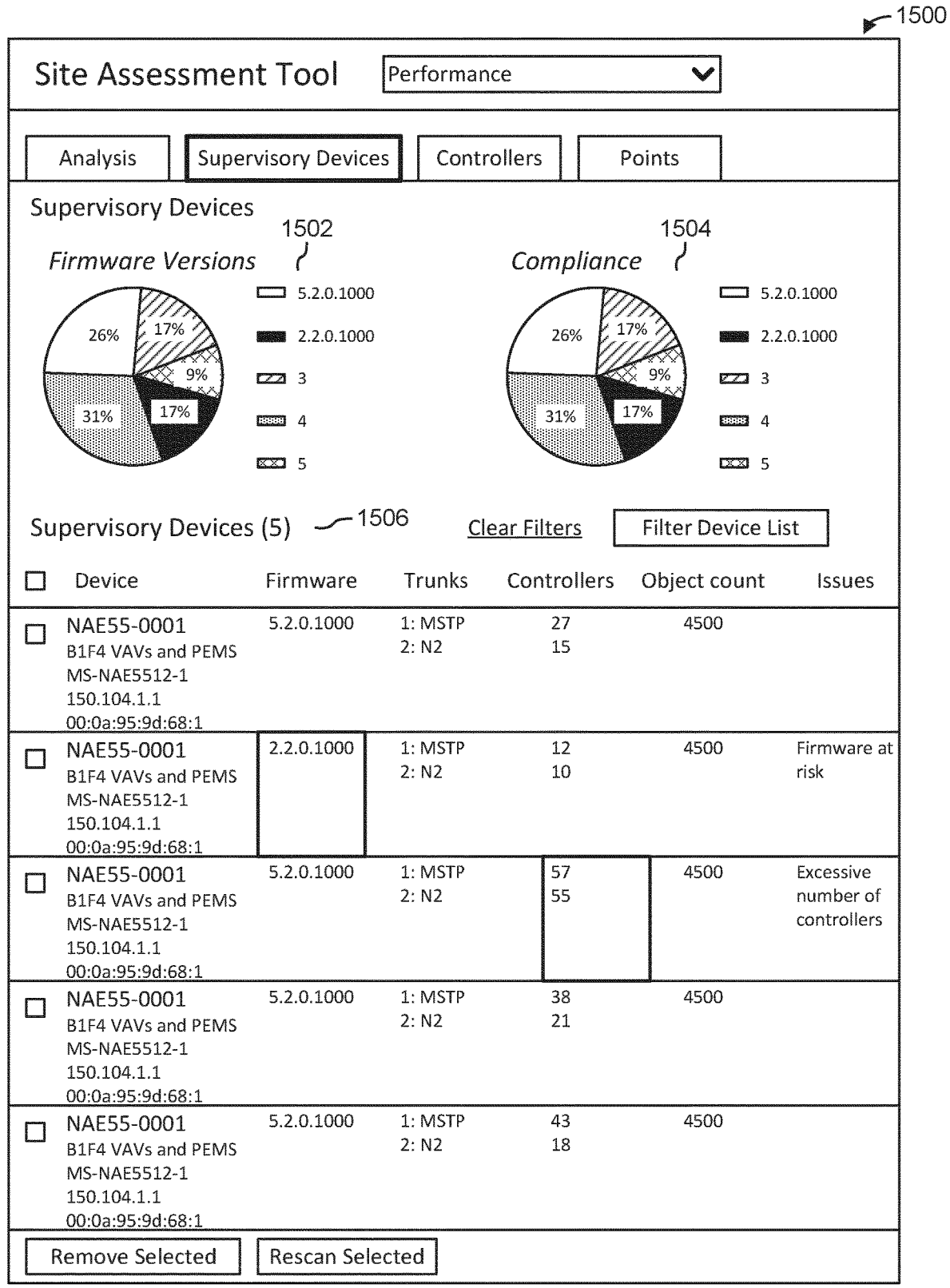
FIG. 15 is a screen shot illustrating a supervisory device performance assessment summary, according to some embodiments.

Turning now to FIG. 15, a screen shot of the performance assessment tool 500 illustrating a supervisory device performance assessment summary 1500 is shown, according to some embodiments. Supervisory devices may be those devices within the BMS responsible for controlling multiple devices or controllers throughout the system. The supervisory device performance assessment summary 1500 may include a firmware versions summary 1502. The firmware versions summary 1502 may provide data relating to what version of firmware is running on the supervisory devices in the system. The supervisory device performance assessment summary 1500 may further include a BMS control software compliance summary 1504. For example, the BMS control software compliance summary 1504 may indicate which version of the BMS control software is being used by the supervisory devices. In one embodiment, the BMS control software is Johnson Control's Metasys software platform. However, other BMS control software platforms are considered, such distributed control platforms (e.g. Verasys from Johnson Controls), a Peak software platform, or a BCM software platform. The supervisory device performance assessment summary 1500 may further include a supervisory device information summary 1506. The supervisory device information summary may present information to a user regarding general information related to each of the supervisory devices in the system. For example, the supervisory device information summary 506 may include the device name, the firmware version, which data trunks the supervisory device is connected to, the number of controllers associated with the supervisory device, an object count, and/or a list of issues associated with each supervisory device. In one embodiment, the supervisory device information summary 506 may include more data or less data associated with each of the listed supervisory devices. For example, a user may be able to select what data should be shown for each supervisory device. The supervisory device information summary 506 may further highlight portions of the displayed data associated with an issue associated with a supervisory device. For example, the firmware version of supervisory device NAE55-0001 is shown as highlighted, as the firmware is of a version which may have a security vulnerability.

Figure 16:
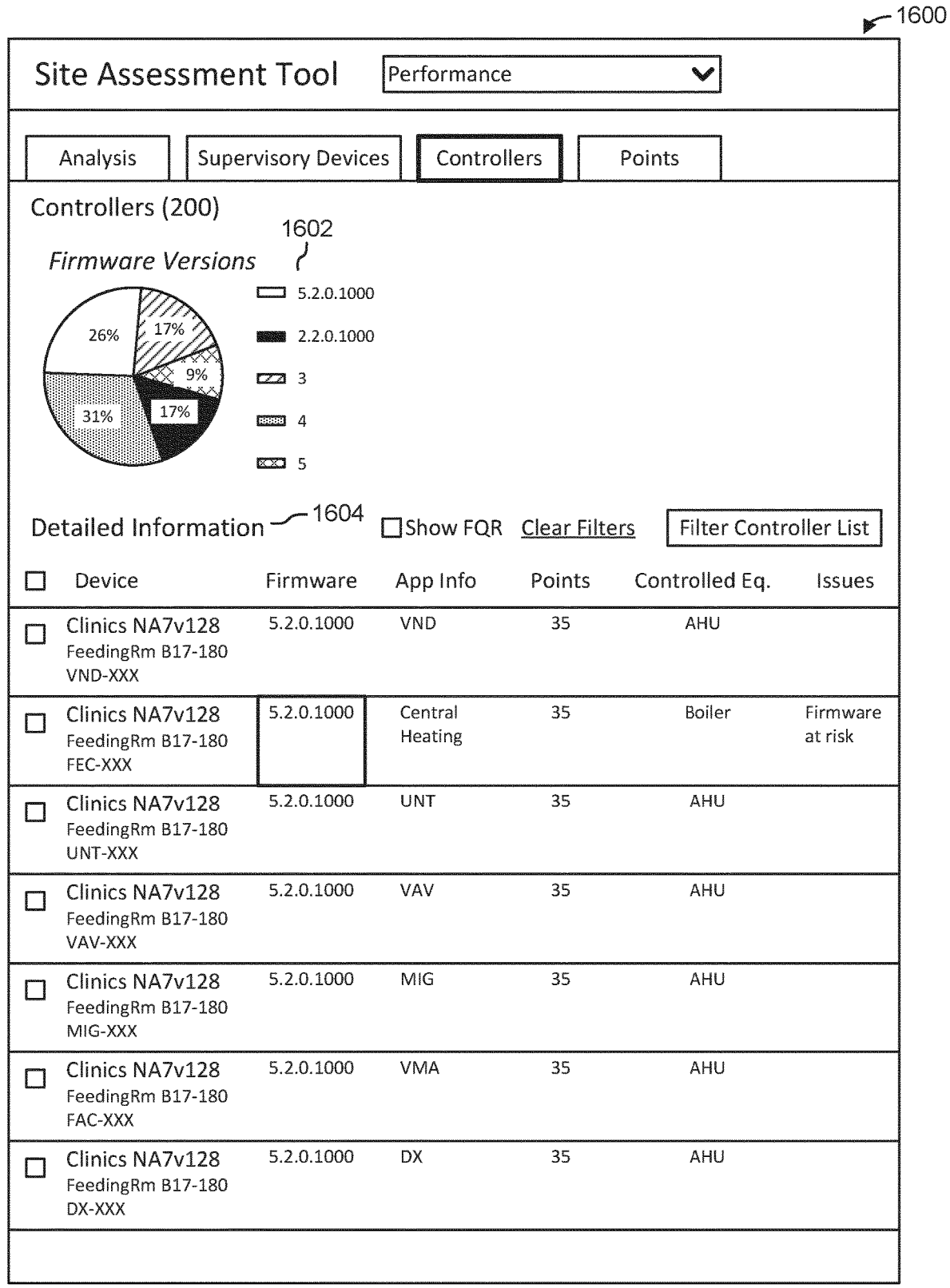
FIG. 16 is a screen shot illustrating a controller performance assessment summary, according to some embodiments.

Turning now to FIG. 16, a screen shot of the performance assessment tool 500 illustrating a controller performance assessment summary 1600 is shown, according to some embodiments. Controllers may be those control devices in the system that are not configured as supervisory devices, but still control one or more other devices within the system. The controller performance assessment summary 1600 may include a controller firmware version summary 1602. The controller firmware version summary 1602 may provide a summary of all the firmware versions being run on the controllers within the system. The controller performance assessment summary 1600 may further include a controller detailed information report 1604. The controller detailed information report 1604 may provide a number of details for each individual controller listed. Example data may include firmware versions, application information, data points associated with the controller, controller equipment (e.g. what equipment or devices are being controlled by the controller), and any other issues. The prior list is for example purposes only, and it is considered that more or fewer details may be provided, as required. In some embodiments, the user may be able to select what data should be shown for each controller. The controller detailed information report 1604 may further highlight portions of the displayed data associated with an issue of a controller. For example, the firmware version of controller NAE7v128 is shown as highlighted, with an accompanying issue in the issue column indicating that the firmware is at risk.

Turning now to FIG. 17, a screen shot of the performance assessment tool 500 is shown illustrating a point summary 1700, according to some embodiments. The point summary 1700 may include a list of all the points in the system. In one embodiment, the point summary 1700 may group the data points based on the type of data point. For example, the data points may be grouped as analog inputs (AI), analog outputs (AO), binary inputs (BI) and binary outputs (BO). However, other data type points are further contemplated. Further, the types of points may be grouped according to the type of devise they are associated with. For example, the point types may be grouped as they related to AHUs, VAVs, FCUs, and/or other device types within the system.

Returning now to FIG. 13A, the process 1300 may generate a customer report at process block 1318, or an internal report at process block 1320. In one embodiment, reports generated at process blocks 1318, 1320 may be PDF-style reports. The reports 1318, 1320 may contain similar information, but may be formatted differently depending on if they are to be presented to a customer or internally. For example, the customer facing report generated at process block 1318 may summarize the overall health of the BMS system, and list any potential service opportunities. In contrast, the internal report generated at process block 1320 may provide an itemized list of potential service opportunities found, and provide detailed information for performing the service. The reports generated at process blocks 1318, 1320 may generally provide information relating to the current performance of the system, as well as suggestions to improve the performance. In some embodiments, the reports generated at process blocks 1318, 1320 may be used as a benchmarking tool to visualize optimization status of the BMS over a time period. For example, year over year. The reports generated at process blocks 1318, 1320 may be based on the analysis results presented at process block 1316. Example reports are provided below; however it is contemplated that the user 1302 may be able to generate customized reports as needed. In some embodiments, the user 1302 may be able to customize the data shown in the reports, display the data in different graphs or charts (e.g. spider graphs, candlestick charts, bar charts, pareto charts, etc.). In further embodiments, the reports may be configured to perform statistical analysis of the data provided, such as Monte Carlo, or best fit analysis. In some embodiments, the user 1302 may be able to generate the reports on the fly, using the performance assessment tool 500.

Figure 18:
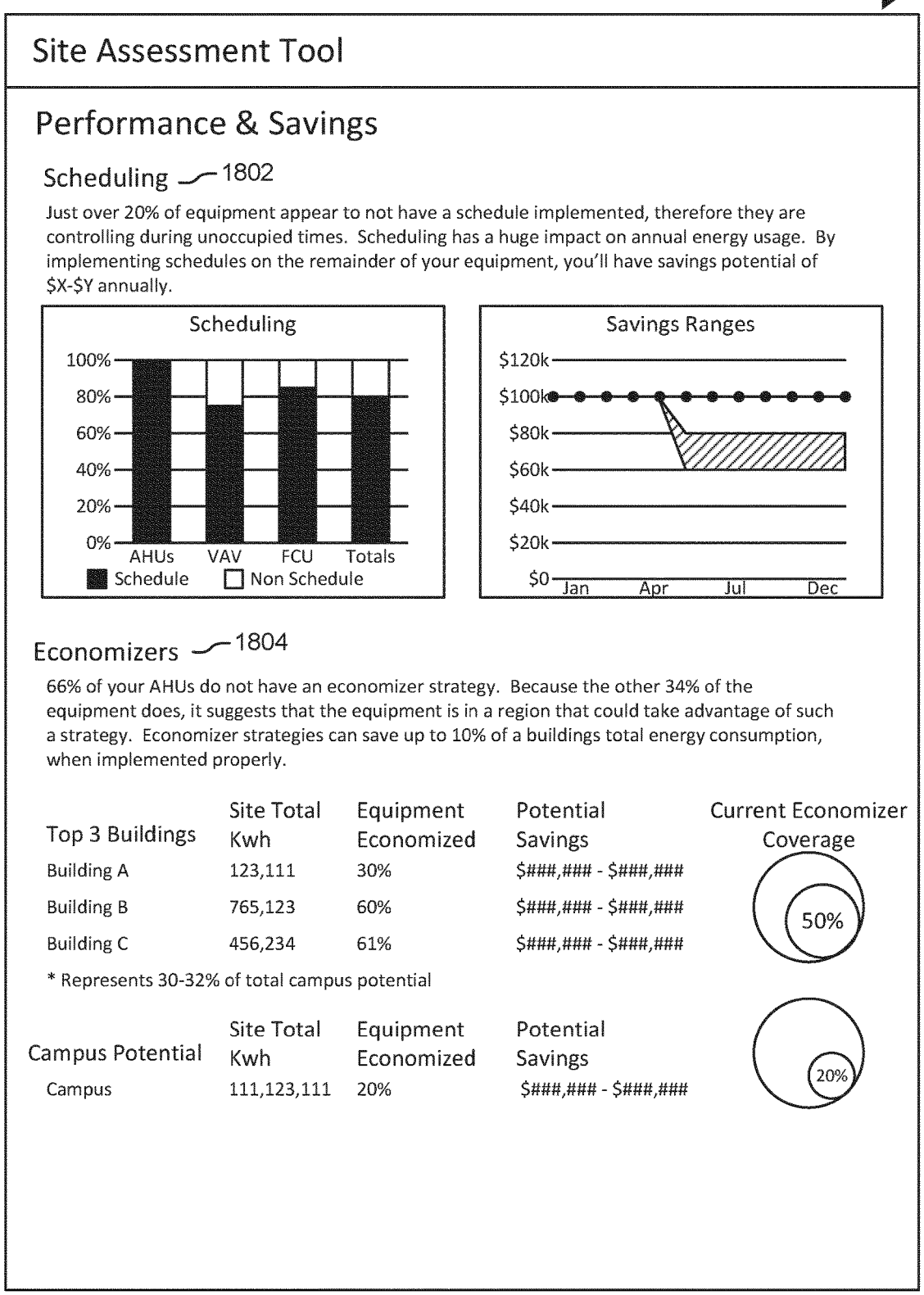
FIG. 18 is a screen shot illustrating a performance and savings report, according to some embodiments.

Turning now to FIG. 18, a performance and savings report 1800 is shown, according to some embodiments. The performance and savings report 1800 may include various data related to the performance and savings for the system. As shown in FIG. 18, the report 1800 includes a scheduling portion 1802. The scheduling portion 1802 may provide a textual portion explaining the current status of the scheduling, as well as potential savings that may be achieved by further scheduling additional portions of the system. The scheduling portion 1802 may further provide graphical illustrations showing the current status of the scheduling performed in the system, as well as a graphical illustration showing the potential savings ranges that could be achieved by scheduling the remaining equipment in the system that is not currently scheduled. The performance and savings report 1800 may further include an economizer portion 1804. The economizer portion 1804 may provide textual and visual indication describing the current status of the current economization of the system, as well as expected savings associated with modifying the economization of components within the system.

Turning now to FIG. 19, a maintenance and reliability report 1900 is shown, according to some embodiments. The maintenance and reliability report 1900 may include information related to various maintenance and/or reliability issues within the system. For example, the maintenance and reliability report 1900 may include information related to dirty filters, chiller operating hours, unbound references, improperly addressed devices, missing critical trends, unacknowledged alarms, and/or percentages or devices exceeding MSEA limitation. However, the above list is exemplary only, and other maintenance and/or reliability information is further contemplated.

Turning now to FIG. 20, a security and standards report 2000 is shown, according to some embodiments. The security and standards report 2000 may include information related to various security and/or standards information within the system. For example, the security and standards report 2000 may include information related to BMS control system (e.g. Metasys, Verasys, etc.) default usernames and password usages. This may indicate that there may be a security issue due to the use of defaults usernames and/or passwords. In further examples, the security and standards report 2000 may include information related to the number of users with administrative privileges, the number of dormant accounts, firmware vulnerability, U/L listed devices, and point categorization (i.e. how are the data points classified.).

In some embodiments, more detailed reports may also be provided. For example, FIG. 21 illustrates a detailed scheduling report 2100. The detailed scheduling report 2100 may include data related to current status of scheduled devices, as well as potential savings that may be achieved by scheduling additional devices. Further, the detailed scheduling report may include the existing scheduling status for each controller in the systems. In other examples, the detailed scheduling report may include the scheduling status for other devices in the system. In some examples, a user may be able to select whether to view devices with schedules or devices without schedules. Turning now to FIG. 22, a detailed motor report 2200 is shown, according to some embodiments. The detailed motor report 2200 may include information related to one or more motors throughout the system. The detailed motor report 2200 may include data related to ideal operations of the motors. For example, the detailed motor report 2200 may provide ideal operation schemes for the motors, to reduce their operation below 100%. Further, the detailed motor report 2200 may include information related to each of the controllers and their associated motors.

Turning now to FIG. 23, an air handling unit reset strategies report 2300 may be generated. The air handling unit reset strategies report 2300 may include information related to the reset strategies for a number of air handling units in the system. In one example, the unit reset strategy may relate to duct static pressure resets or discharge air temperature resets. However, other reset strategies are contemplated. The air handling unit reset strategies report 2300 may further include information related to each controller responsible for controlling the number of air handling units, and their implemented reset strategies, if any.

Turning now to FIG. 24, a 100% outdoor air handling unit report 2400 is shown, according to some embodiments. The 100% air handling unit report 2400 may include information related to portions of the system which require 100% outside air. For example, operating rooms and some laboratories may require 100% of the air to be from the outside. The 100% outdoor air handling unit report 2400 may provide information related to the controllers for the areas set to use 100% outside air. This report can be used to determine if the areas currently using 100% outside air required to do so, thereby allowing a user or customer to quickly visualize potential savings by eliminating 100% outside air area when it is not required.

Turning now to FIG. 25, a dirty filter report 2500 is shown, according to some embodiments. The dirty filter report 2500 may provide information relating to filter statuses across the system. In some examples, the controllers associated with the devices having the dirty filters are also listed along with any associated filters. Turning now to FIG. 26, a detailed UL listed device report is shown, according to some embodiments. The detailed UL listed device report may contain a comprehensive list of all the UL listed devices, such as those used for smoke control, located within the system. Turning now to FIG. 27, a detailed firmware vulnerabilities report 2700 is shown, according to some embodiments. The detailed firmware vulnerabilities report 2700 may provide a comprehensive list of all devices within the system which are noted as having firmware vulnerabilities, such as having out of date firmware. Finally, turning now to FIG. 28, a detailed economizer report 2800 is shown, according to some embodiments. The detailed economizer report 2800 may provide a detailed view of the current status of economization of devices within the system. The detailed economizer report 2800 may also provide information relating to potential savings that may be achieved by increasing the amount of devices performing economization, or modification of existing economization schemes. The detailed economizer report 2800 may further include a list of all the controllers associated with the devices that are currently economized, or are capable of being economized.

Returning now to FIG. 13A, once the reports have been generated at process blocks 1218, 1320, the project may be saved at process block 1322. In one embodiment, the project is saved in the memory 508 of the performance assessment tool 500. In other embodiments, the project is saved in the knowledgebase 540. Once the project has been saved, the generated customer reports may be presented to a customer at process block 1324. Presenting the customer reports to the customer may include providing a digital copy to the customer. In other embodiments, a link to view the report may be provided to the customer. In still further embodiments, the user 1302 may provide report to the client electronically (CD ROM, Flash Drive, etc.) or provide a hard copy.

At process block 1326, the user 1302 may use the generated internal report to correct issues related to the system. For example, the process 1300 may be used to provide a list of action items for increasing the performance of the system. In one example, a service technician may run the report to determine what maintenance is required. In other embodiments, the process 1300 may be initiated after commissioning of the system, or when new components are added.

Figure 13B:
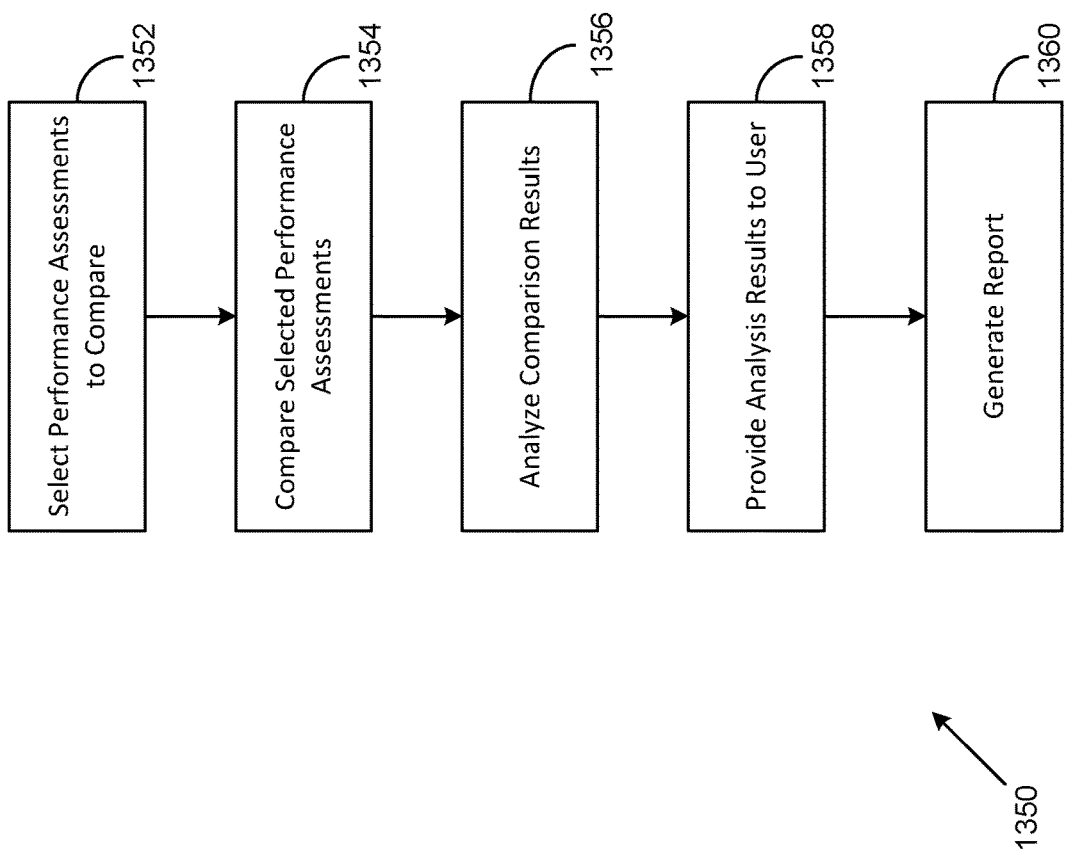
FIG. 13B is a flow chart illustrating a system performance comparison process, according to some embodiments.

The user 1302 may optionally instruct the performance assessment tool 500 to compare performance assessments. Turning now to FIG. 13B, a process 1350 for comparing performance assessments is shown, according to some embodiments. In one embodiment, the process 1350 is performed after the process 1300, described above, completes the performance assessment of the BMS. However, in other embodiments, a user may be able to compare the two or more previously determined performance assessments. For example, the user 1302 may wish to compare previously saved projects to determine how the system performance has changed over time. At process block 1352 the user 1302 selects which projects to compare. For example, the user 1302 may select the most recently completed project and a project from one year prior for analysis. In other examples, the user 1302 may select any two saved projects for comparison. In some embodiments, the user 1302 may select more than two projects for comparison.

At process block 1354 the projects are compared. In one embodiment, the projects are compared by comparing the performance scores associated with different features of the BMS. For example, the performance scores associated with the performance and savings, maintenance and reliability, security and standards, and/or comfort and health of the BMS may be compared. In other embodiments, other portions of the BMS performance can be prepared. In one embodiment, the user 1302 may be able to select which performance aspects of the BMS system they would like compared. In other embodiments, each of the performance aspects of the BMS system assessed in each project selected for comparison will be compared. In further embodiments, the inventory associated with the selected project may also be compared, as described in regards to FIG. 11, above.

At process block 1356, an analysis is performed on the comparison results. The analysis may be performed by the system performance module 512 of the performance assessment tool 500. The analysis may provide additional analysis of the comparison results. For example, the analysis may determine metrics, such as improvements over time in performance. In other embodiments, the analysis may further determine what changes have occurred to the BMS between the time of each of the compared projects, and provide additional information around the improvements, or decreases, in performance associated with one or more changes made to the BMS. For example, changes in inventory, firmware updates, etc. Further analysis may include analyzing the data to provide a graphical representation of the changes in the performance of the BMS. In still further embodiments, the analysis may determine additional changes or modifications to the BMS that could further improve the performance of the BMS. Once the analysis is completed, the differences between the projects may be provided to the user at process block 1358. For example, the pure comparison results, along with the analysis performed at process block 1356. Finally, a performance comparison report may be generated at process block 1360 to show the differences in the performance of the system over time. In some embodiments, the performance comparison report may include both the comparison results, as well as the analysis performed at process block 1356.

Turning now to FIG. 29, a performance comparison report 2900 is shown, according to some embodiments. The performance comparison report 2900 may provide a comparison illustrating a performance assessment summary of the system being analyzed at two or more time periods. For example, the performance comparison report 2900 may compare two performance assessment summaries one year apart. Similar to the performance assessment summary 1400 described above, the performance comparison report may include a comparative performance and savings score 2902, a maintenance and reliability score 2904, a security and standards score 2906 and a comfort and health score 2908. Similar to above, these scores 2902, 2904, 2906, 2908 may provide a numerical score indicating the current determined performance scores for each of the above categories. In some examples, additional categories may also be presented to a user having a numerical score. In one embodiment, the numerical score may be between one and ten, with ten representing the best score for a system. However, other scoring schema are also considered. For example, the scores 2902, 2904, 2906, 2908 may be presented as an alphabetical rating system (e.g. A, B, C, D, F). In further embodiments, the scores 2902, 2904, 2906, 2908 may be highlighted to provide a visual indication of the overall score. For example, red may indicate a poor performance score, yellow a neutral performance score, and green a high performance score.

Additionally, each score 2902, 2904, 2906, 2908 may have a difference indicator to indicate the change in the score over time. For example, the performance and savings score 2902, may have a performance and savings difference indicator 2910. The performance and savings differences indicator 2910 may be a positive or negative number where the performance and savings score 2902 is a numerical value. For example, if the performance and savings score 2902 has improved from a score of five, to a score of six in the time period provided in the comparison, the performance and savings difference indicator 2910 would be one. However, if the performance and savings score 2902 has decreased from a score of five to a score of four, the performance and savings difference indicator 2910 would be negative one. Similarly, if there is no change in the performance and savings score 2902, the performance and savings difference indicator 2910 would be zero. Similarly, the maintenance and reliability score 2904 has a maintenance and reliability difference indicator 2912, the security and standards score 2906 has a security and standards difference indicator 2914, and the comfort and health score 2908 has a comfort and health difference indicator 2916.

By illustrating the difference in performance and savings, maintenance and reliability, security and standards, and comfort and health, the user can quickly determine the impact of changes to a system over a period of time. In some instances, this can provide a useful tool to monitor improvements made to a BMS system over time, and to easily display and relay the information to other. Additionally, while the above examples describe comparing performance of a given system over time, it is contemplated that the performance assessment tool 500 described above may further be able to provide similar comparisons between different, but similar systems. For example, the performance assessment tool 500 may be configured to compare the performance of a BMS system associated with one facility, with a BMS system associated with a similar facility. In some embodiments, the performance assessment tool 500 may have access to the performance data for multiple BMS systems in a variety of applications, such as factories, office building, colleges or universities, and/or hospitals. The performance data may be used to provide performance comparison reports, such as performance comparison report 2900 described above. The performance comparison reports may be used to benchmark different similar facilities against each other. In some embodiments, the results from the benchmarked results can be used to generate performance scores for different aspects of a BMS, such as those described above.

Figure 30:
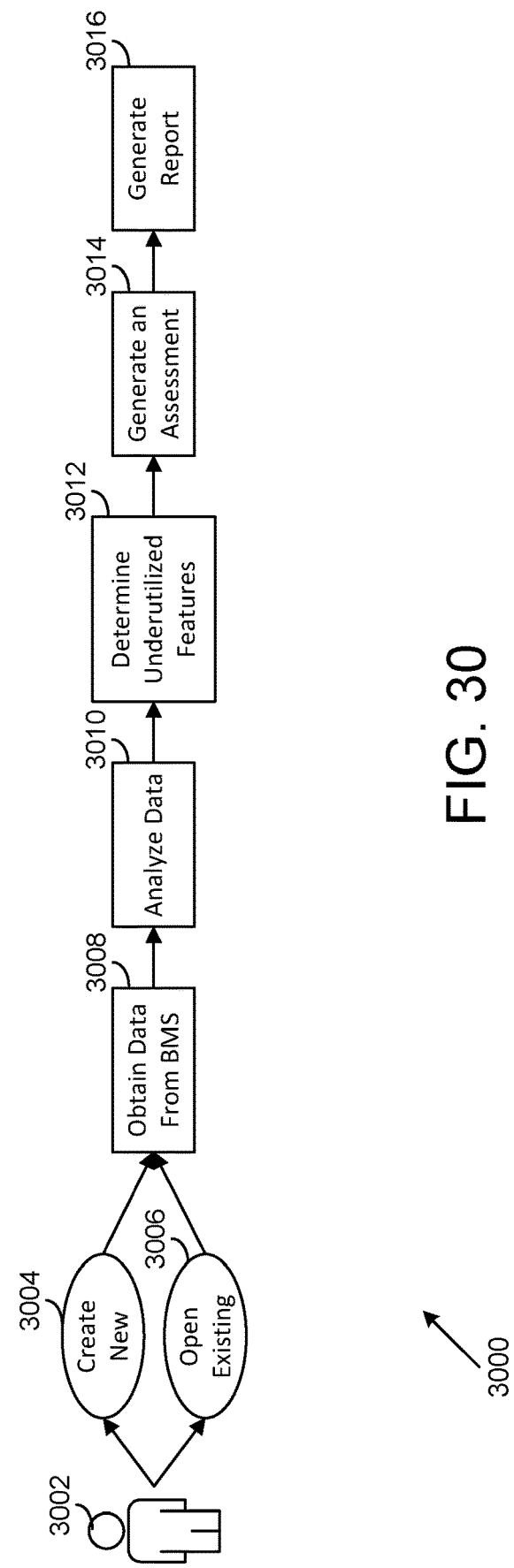
FIG. 30 is a flow chart illustrating a feature assessment process, according to some embodiments.

Turning now to FIG. 30, a feature assessment process 3000 is shown, according to some embodiments. A user 3002 may choose to create a new feature assessment project at process block 3004, or open an existing assessment project at process block 3006. Once the feature assessment project has been selected, the performance assessment tool 500 may receive data from the BMS 526 via the communication interface 518. In some embodiments, the performance assessment tool 500 may transmit a request for data to the BMS 526 via the communication interface 518. For example, the performance assessment tool 500 may request data specifically related to one or more features of within the BMS 526. In other examples, the performance assessment tool 500 may extract the required data from data received from the BMS 526 via the communication interface 518. The data may be stored in one or more controllers within the BMS 526 capable of utilizing the features. Further, the system features module 514 may generate the instructions to retrieve the data from the BMS 526.

In a further embodiment, the performance assessment tool 500 may access the knowledgebase 540, and provide feature related data within the knowledgebase 540 to the performance assessment tool 500. The feature related data may include historical utilization data, typical utilization data, potential savings data, etc. The potential savings data may be potential energy savings data, potential cost savings data, etc. In some embodiments, the potential savings data is determined based on previous savings data gathered from previous installation of the one or more features of the BMS. In other examples, general data, such as energy costs provided by the Department of Energy, may be used to provide potential savings data. In some embodiments, the feature related data includes data related to the BMS 526. In further embodiments, the feature related data may include data related to the BMS 526, as well as other BMS systems. For example, the knowledgebase 540 may be a central repository for all BMS systems associated with a given entity (e.g. company, system provider, etc.). In other examples, the knowledgebase 540 may be a central repository for BMS systems associated with multiple entities. Accordingly, the feature related data may be able to provided historical utilization data, typical utilization data, previously measured savings data, or other like data, based on data provided my multiple BMS systems of differing size and complexity. This can allow the system features module 514 to benchmark the current utilization of features within the BMS 526 against other BMS systems across different industries, geographic locations, etc.

At process block 3010, the data is analyzed to determine a number of feature utilization attributes. In one embodiment, the data is analyzed by the system features module 514 of the performance assessment tool 500. The system features module 514 may analyze data received from both the BMS 526, as well as the knowledgebase 540. The feature utilization attributes may be a usage history for one or more features. The feature utilization attributes may further be a listing of all controllers and/or devices within the system that current utilize one or more available features, as well as a listing of all controllers and/or devices within the BMS 526 that are not utilizing the one or more features. Similarly the feature utilization attributes may be an analysis of which systems and/or subsystems currently utilize one or more available features. The feature utilization attributes may further include information relating to all of the systems, subsystems, controllers, and/or devices within the BMS 526 which are capable of utilizing the one or more features.

At process block 3012 the system features module 514 may determine what, if any, features within the system are underutilized, or not utilized at all. The system features module 514 may analyze the feature utilization attributes to determine which features may be underutilized. In some examples, the system features modules 514 may determine that a feature is underutilized when the features has not been activated within the BMS. In other embodiments, the system features module 514 may determine that a feature is underutilized when the feature is only activated in a portion of the BMS 526. In still further embodiments, the system features module 514 may determine a feature is underutilized if the potential benefits of the feature are not being realized. The potential benefits may include energy savings, cost savings, efficiency increases, etc. In one embodiment, the system features module 514 evaluates the current benefits being realized by the BMS 526, and compare the current realized benefits against similar BMS systems utilizing similar features to determine if the feature is underutilized. For example, the system features module 514 may analyze feature utilization data from other similar BMS systems provided by the knowledgebase 540, such as annual cost savings, equipment efficiencies, percent utilization with sub-systems of the BMS, etc. This information can then be used to compare, or benchmark, the feature utilization of the BMS 526.

At process block 3014, the system features module 514 generates an assessment of the utilization of one or more features associated with the BMS 526. In one embodiment, the assessment includes a listing of underutilized features associated with the BMS 526. The assessment may further describe the benefit of each identified, underutilized feature. In some embodiments, the system feature module 514 what requirements are necessary to implement a certain feature in the system. In one embodiment, the system feature module 514 may determine the requirements to implement the feature in the system based on the size of the system (e.g. the number of devices, data points, etc.). Further, the system feature module 514 may, via the performance assessment tool 500, provide data to the knowledgebase 540 regarding the determination of the utilization of features in the system. This data may be saved as feature related data which can be used in future feature utilization assessments. In one embodiment, the assessment is provided to the user 3002 via the user interface 520 of the performance assessment tool 500. In other embodiments, the assessment may be transmitted for display on a mobile device, such as mobile device.

Figure 31:
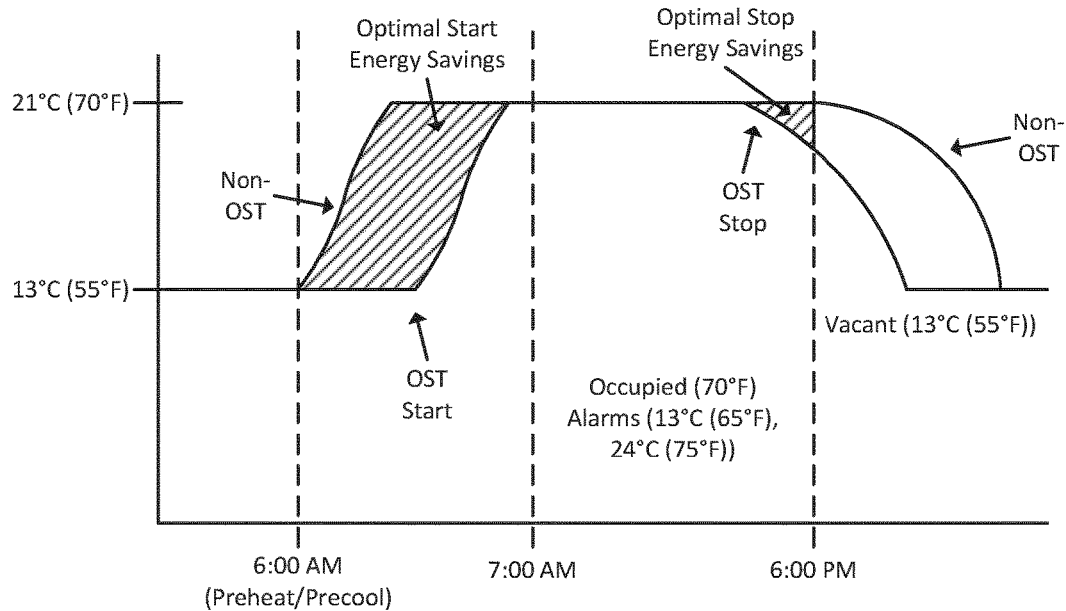
FIG. 31 is a screen shot illustrating an optimal start feature report, according to some embodiments.

At process block 3016, a report is generated. In one embodiment, the report may be a PDF-style report. The report may include a listing of features that are underutilized within the BMS 526. Example features may include an optimal start feature, a Demand Limiting Load Rolling (DLLR) feature, a user views feature, a solar clock feature, a tailored summary, a BMS control system (e.g. Metasys, Verasys, etc.) user interface feature, and other features, as applicable. Turning now to FIG. 31, an optimal start feature report 3100 is shown, according to some embodiments. In one example, the optimal start feature may be an Optimal Start Stop (OSS) solution from Johnson controls. The OSS solution is a fully engineered Metasys configuration tool designed to reduce the operating hours of constantly running equipment or equipment operating against a fixed time schedule. The OSS solution can adjust system start and stop times to meet a desired set point based on multiple variables such as zone temperatures and outdoor air conditions. The OSS solution can be used to save energy, reduce runtime, extend equipment life, and/or reduce carbon output. The optimal start feature report 3100 may provide information to the user regarding the potential impact of implementing the optimal start feature within the system.

Turning now to FIG. 32, a demand limiting load rolling (DLLR) report 3200 is shown, according to some embodiments. The DLLR feature may be used to limit peak energy usage by monitoring the actual energy usage, comparing it to a user configured tariff structure, and then shedding non-critical loads to ensure the optimal usage by avoiding additional cost. For example, demand limiting may be used to selectively turn off equipment, such as fans and lights, or to adjust set points to limit energy use during periods of the day that are traditionally high-usage. Similarly, load rolling may continuously act to maintain a specified energy reduction by shedding non-critical loads, which can help to reduce overall energy consumption. The DLLR report 3200 may provide a basic overview to the user 2902, and provide information relating to the impact of implementing a DLLR feature in the system.

Turning now to FIG. 33, a user views report 3300 is shown, according to some embodiments. The user views report 3300 may provide an assessment of the current user interface views, and provide feedback regarding how to better implement the user views functionality. The user views feature may allow any object in the system to be displayed, such as schedules, room temperatures, and graphics. In one embodiment, the user views feature may allow for user specific views. Returning now to FIG. 30, once the reports have been generated at process block 3012, the reports can be provided to a customer or other end user at process block 3014.

Figure 34:
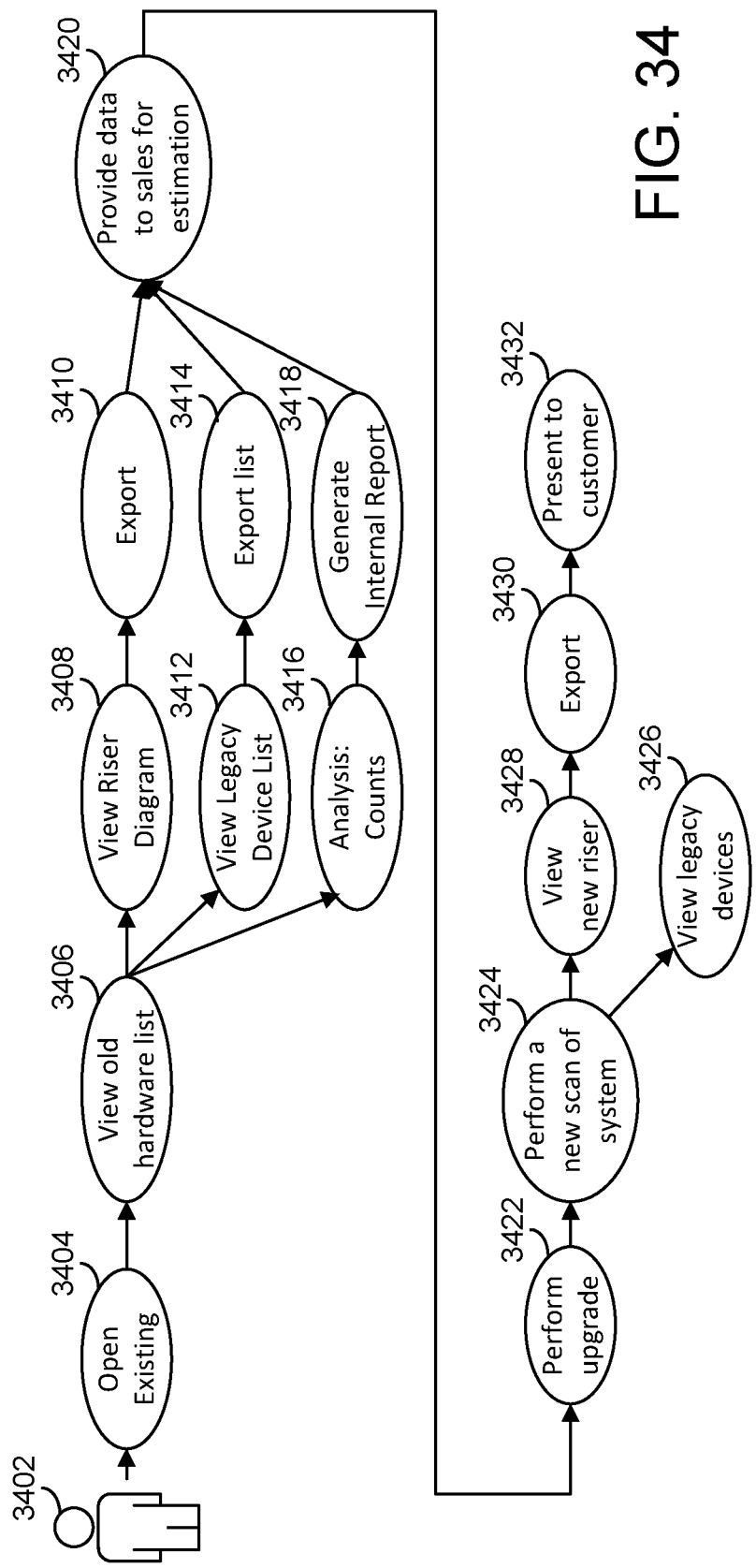
FIG. 34 is a flow chart illustrating a riser assessment process, according to some embodiments.

Turning now to FIG. 34, a riser assessment process 3400 is shown, according to some embodiments. The riser assessment process 3400 may be used to evaluate the current devices and controls in a system prior to and after an upgrade to the system. In one embodiment, the riser assessment process 3400 may be used to determine how to best upgrade a system. A user 3402 may open an existing project at process block 3404. The existing hardware list is then provided at process block 3406. In one embodiment, the process may provide the current riser diagram at process block 3408. The riser diagram may provide an overall schematic view of one or more sub-systems within the system. The riser diagram may then be exported to a visualization program at process block 3410. In one embodiment, the visualization program is Microsoft Visio. The process 3400 may further provide a list of legacy devices at process block 3412. The list of legacy devices may then be exported to the visualization program at process block 3414. The process 3400 may also provide an analysis of the counts at process block 3416. The analysis of the counts can then be used to generate an internal report at process block 3418. At process block 3420 the internal report, legacy device list and riser diagram may be exported to a sales program for estimation of a cost to upgrade the existing system. At process block 3422 the upgrade may be performed. In one embodiment, the upgrade is physically performed. In other embodiments, the upgrade is simulated. Once the upgrade has been performed, a new scan of the system can be performed at process block 3424. At process block 3426 the process 3400 may provide a list of any remaining legacy devices in the system. At process block 3428 the process may generate the new riser diagram. At process block 3430 the generated new riser diagram may be exported to the visualization program. Finally, the exported riser diagram may be provided to a customer for their records or review at process block 3432.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for comparing attributes of a building management system (BMS) over time, the method comprising: generating, by a processor configured to access the BMS, a first assessment of the BMS at a first time, the first assessment comprising:
an inventory assessment that identifies one or more controllers installed in the BMS at the first time, one or more supervisory devices installed in the BMS at the first time, one or more servers associated with the BMS at the first time, or one or more points associated with the BMS at the first time;
a performance assessment that identifies performance issues associated with one or more control strategies for equipment in the BMS at the first time or performance issues associated with the one or more supervisory devices installed in the BMS at the first time; and
a feature assessment that identifies one or more BMS user interface features being underutilized by the BMS at the first time;
presenting a user interface that allows a user to view a comparison of the first assessment and a second assessment of the BMS generated at a second time, the second time occurring prior to the first time; and
implementing a recommendation for the BMS included in the comparison.

2. The method of claim 1, wherein the performance assessment identifies an HVAC device that does not have an operating schedule associated therewith and provides an indication of energy savings predicted to result from configuring the operating schedule for the HVAC device.

3. The method of claim 1, wherein the user interface allows the user to view one or more new controllers that have been installed in the BMS between the second time and the first time.

4. The method of claim 1, wherein the the recommendation is a firmware update associated with the one or more controllers or the one or more supervisory devices.

5. The method of claim 4, wherein the user interface allows the user to transmit the firmware update to the one or more controllers or to the one or more supervisory devices.

6. The method of claim 1, wherein the performance assessment provides an indication of equipment in the BMS with a dirty filter associated therewith and one or more issues resulting from the dirty filter.

7. The method of claim 6, further comprising identifying the dirty filter by determining that a pressure drop across the dirty filter is greater than a threshold.

8. A building management system (BMS) comprising:
one or more processors; and
one or more computer-readable storage media having instructions stored thereon that, when executed by the one or more processors, cause the one or more processors to implement operations comprising:
generating a first assessment of the BMS at a first time, the first assessment comprising:
an inventory assessment that identifies one or more controllers installed in the BMS at the first time, one or more supervisory devices installed in the BMS at the first time, one or more servers associated with the BMS at the first time, or one or more points associated with the BMS at the first time;
a performance assessment that identifies performance issues associated with one or more control strategies for equipment in the BMS at the first time or performance issues associated with the one or more supervisory devices installed in the BMS at the first time; and
a feature assessment that identifies one or more BMS user interface features being underutilized by the BMS at the first time; and presenting a user interface that allows a user to view a comparison of the first assessment of the BMS at the first time to a second assessment of the BMS at a second time, the second time occurring prior to the first time; and implementing a recommendation for the BMS included in the comparison.

9. The system of claim 8, wherein the performance assessment identifies an HVAC device that does not have an operating schedule associated therewith and provides an indication of energy savings predicted to result from configuring the operating schedule for the HVAC device.

10. The system of claim 8, wherein the user interface allows the user to view one or more new controllers that have been installed in the BMS between the second time and the first time.

11. The system of claim 8, wherein the inventory assessment recommends a firmware update associated with the one or more controllers or the one or more supervisory devices.

12. The system of claim 11, wherein the user interface allows the user to transmit the firmware update to the one or more controllers or the one or more supervisory devices.

13. The system of claim 8, wherein the performance assessment provides an indication of equipment in the BMS with a dirty filter associated therewith and one or more issues resulting from the dirty filter.

14. The system of claim 13, the operations further comprising identifying the dirty filter by determining that a pressure drop across the dirty filter is greater than a threshold.

15. A device for comparing attributes of a building management system (BMS) over time, the device comprising:
one or more processing circuits configured to implement operations comprising:
generating a first assessment of the BMS at a first time, the first assessment comprising:
an inventory assessment that identifies one or more controllers installed in the BMS at the first time, one or more supervisory devices installed in the BMS at the first time, one or more servers associated with the BMS at the first time, or one or more points associated with the BMS at the first time;
a performance assessment that identifies performance issues associated with one or more control strategies for equipment in the BMS at the first time or performance issues associated with the one or more supervisory devices installed in the BMS at the first time; and
a feature assessment that identifies one or more BMS user interface features being underutilized by the BMS at the first time; and
presenting a user interface that allows a user to view a comparison of the first assessment of the BMS at the first time to a second assessment of the BMS at a second time, the second time occurring prior to the first time; and implementing a recommendation for the BMS included in the comparison.

16. The device of claim 15, wherein the performance assessment identifies an HVAC device that does not have an operating schedule associated therewith and provides an indication of energy savings predicted to result from configuring the operating schedule for the HVAC device.

17. The device of claim 15, wherein the user interface allows the user to view one or more new controllers that have been installed in the BMS between the second time and the first time.

18. The device of claim 15, wherein the inventory assessment recommends a firmware update associated with the one or more controllers or the one or more supervisory devices and allows the user to transmit the firmware update to the one or more controllers or the one or more supervisory devices.

19. The device of claim 15, wherein the performance assessment provides an indication of equipment in the BMS with a dirty filter associated therewith and one or more issues resulting from the dirty filter.

20. The device of claim 19, the operations further comprising identifying the dirty filter by determining that a pressure drop across the dirty filter is greater than a threshold.

* * * * *